United States Patent
Hammond

(10) Patent No.: US 11,220,306 B2
(45) Date of Patent: *Jan. 11, 2022

(54) CROWN FORK SUPPORTED BICYCLE CARRIER

(71) Applicant: North Shore Racks Inc., North Vancouver (CA)

(72) Inventor: Malcolm Thomas Hammond, North Vancouver (CA)

(73) Assignee: North Shore Racks Inc., North Vancouver (CA)

( * ) Notice: Subject to any disclaimer, the term of this patent is extended or adjusted under 35 U.S.C. 154(b) by 0 days.

This patent is subject to a terminal disclaimer.

(21) Appl. No.: 16/781,205

(22) Filed: Feb. 4, 2020

(65) Prior Publication Data

US 2020/0172185 A1    Jun. 4, 2020

Related U.S. Application Data

(63) Continuation of application No. 15/865,213, filed on Jan. 8, 2018, now Pat. No. 10,597,101, which is a
(Continued)

(51) Int. Cl.
  *B60R 9/06*    (2006.01)
  *B62H 3/02*    (2006.01)
  (Continued)

(52) U.S. Cl.
  CPC ............. *B62H 3/02* (2013.01); *B60R 9/06* (2013.01); *B60R 9/10* (2013.01); *B62H 3/12* (2013.01)

(58) Field of Classification Search
  CPC .... B62H 3/02; B62H 3/12; B60R 9/06; B60R 9/10
  See application file for complete search history.

(56) References Cited

U.S. PATENT DOCUMENTS

| 2,329,088 A | 9/1943 | Schram et al. |
| 3,921,869 A * | 11/1975 | Rogers .............. B60R 9/10 |
| | | 224/500 |

(Continued)

FOREIGN PATENT DOCUMENTS

| DE | 3890700 | 12/1996 |
| EP | 0095548 | 12/1983 |

(Continued)

OTHER PUBLICATIONS

Hang5 Rack Instructions, publication date unknown.
(Continued)

*Primary Examiner* — Corey N Skurdal
(74) *Attorney, Agent, or Firm* — Nicholas Garner; Oyen Wiggs Green & Mutala LLP

(57) ABSTRACT

Disclosed is a bicycle carrier having a support mast, an elongate support member extending from the support mast, and a fork crown cradle disposed along the elongate support member. The fork crown cradle is for receiving a fork crown of a bicycle. The cradle includes at least one member extending angularly relative to a longitudinal axis of the elongate support member and at least one tine extending angularly relative to a longitudinal axis of the elongate support member. The at least one member and the at least one tine of the fork crown cradle are spaced-apart so as to allow the fork crown to be received by the fork crown cradle. A head tube of the bicycle is disposed adjacent to the at least one tine of the fork crown cradle. The at least one member of the fork crown cradle is disposed between fork tubes of the bicycle.

20 Claims, 31 Drawing Sheets

Related U.S. Application Data continuation of application No. 13/841,990, filed on Mar. 15, 2013, now Pat. No. 9,862,439, which is a continuation-in-part of application No. 13/004,748, filed on Jan. 11, 2011, now Pat. No. 8,434,655, which is a continuation-in-part of application No. 11/453,095, filed on Jun. 15, 2006, now Pat. No. 7,959,047, which is a continuation-in-part of application No. 10/782,174, filed on Feb. 20, 2004, now Pat. No. 7,900,802.

(51) Int. Cl.
  *B62H 3/12* (2006.01)
  *B60R 9/10* (2006.01)

(56) References Cited

U.S. PATENT DOCUMENTS

| | | |
|---|---|---|
| 4,171,077 A | 10/1979 | Richard, Jr. |
| 4,296,879 A | 10/1981 | Jordening |
| 5,067,641 A | 11/1991 | Johnson et al. |
| 5,127,564 A | 7/1992 | Romero |
| 5,211,323 A | 5/1993 | Chimenti et al. |
| 5,526,971 A | 6/1996 | Despain |
| 5,558,261 A | 9/1996 | Hedeen |
| 5,647,521 A | 7/1997 | Burgess |
| 5,775,555 A | 7/1998 | Bloemer et al. |
| 5,788,135 A | 8/1998 | Janek |
| 5,803,330 A | 9/1998 | Stack et al. |
| 5,871,131 A | 2/1999 | Low et al. |
| 5,996,870 A | 12/1999 | Shaver |
| 6,010,049 A | 1/2000 | Stein |
| 6,123,498 A | 9/2000 | Surkin |
| 6,371,309 B1 | 4/2002 | Smith |
| 6,435,523 B1 | 8/2002 | Hilk |
| 6,491,195 B1 | 12/2002 | McLemore et al. |
| 6,516,986 B1 | 2/2003 | Lassanske et al. |
| 6,834,786 B2 | 12/2004 | Hansen |
| 7,614,637 B1 | 11/2009 | Kidd |
| 8,292,317 B1 | 10/2012 | Winters |
| 2001/0035446 A1 | 11/2001 | Walstrom et al. |
| 2004/0050807 A1 | 3/2004 | Cheng |
| 2004/0159690 A1 | 8/2004 | Hansen |
| 2011/0053482 A1 | 3/2011 | McKenzie |

FOREIGN PATENT DOCUMENTS

| | | |
|---|---|---|
| EP | 0721860 | 7/1996 |
| GB | 2327655 | 2/1999 |
| WO | WO 89/01883 | 3/1989 |
| WO | WO 03/064214 | 8/2003 |

OTHER PUBLICATIONS

Softride Racks, Hang5—Bike Rack Shuttling Action (Softride Hang5 Hitch Mounted Bike Rack), Oct. 21, 2011, https://www.youtube.com/watch?v=KQ3_13x-BTI (Year: 2011).

* cited by examiner

CROWN FORK SUPPORTED BICYCLE CARRIER

BACKGROUND OF THE INVENTION

Field of the Invention

The present invention relates to a bicycle carrier and, in particular, to a vehicle mounted bicycle carrier having a cradle for engaging a fork crown of a bicycle.

Description of the Related Art

Bicycles are often transported between locations on carriers attached to vehicles. In many cases, these carriers include an arm or cradle that a top tube of a bicycle rests on or in, to support the bicycle. However, women's bicycles and many newer non-traditional frames, especially full suspension mountain bikes, do not have a top tube. As a result, these types of bicycles cannot be directly mounted on such carriers.

Several bicycle carrier designs aim to overcome this problem. One such design places the bicycle on top of the vehicle by removing the front wheel of the bicycle and clamping the carrier to the exposed ends of the bicycle fork. Problems with this design include the hassle associated with removing the front wheel, and the need to store the wheel elsewhere. Also the bicycle needs to be lifted up high and placed on top of the vehicle. Another carrier design incorporates a surrogate top tube, as disclosed in U.S. Pat. No. 6,435,523 to Hilk issued Aug. 20, 2002, whereby a tube is attached to the handlebars and seat post of a bicycle. The bicycle and attached tube is then affixed to the bicycle carrier. This design requires the user to attach the device to the bicycle in two different places, and then to attach the device to the bicycle carrier, adding greatly to the amount of time needed to attach the bicycle to the vehicle. Yet other carrier designs carry a bicycle behind a vehicle via cradles in which the bicycle wheels sit. This style of bicycle carrier is generally large, complicated, and cumbersome, especially those which carry a plurality of bicycles. Another common design of hitch mounted bicycle carriers simply stacks the bicycles on a fork or similar structure, requiring the removal of the outermost bicycles to access the innermost bicycles.

SUMMARY OF THE INVENTION

It is an object of the present invention to provide a vehicle mountable bicycle carrier capable of carrying any bicycle regardless of its frame design.

It is another object of the present invention to provide a vehicle mountable bicycle carrier which is easy to use.

It is a further object of the present invention to provide a vehicle mountable bicycle carrier which carries one or more bicycles without removing any part of any bicycle.

It is still further object of the present invention to provide a vehicle mountable bicycle carrier which carries a plurality of bicycles and does not require the removal of any bicycle to access another bicycle.

It is yet still a further another object of the present invention to provide a vehicle mountable bicycle carrier which is not overly complex and cumbersome.

There is provided a bicycle carrier according to a first aspect. The bicycle carrier includes a support mast. The bicycle carrier includes an elongate support member extending from the support mast. The elongate support member has a longitudinal axis. The bicycle carrier includes a fork crown cradle disposed along the elongate support member. The fork crown cradle includes at least one member extending angularly relative to the longitudinal axis of the elongate support member.

There is also provided a bicycle carrier according to another aspect. The bicycle carrier includes a support mast. The bicycle carrier includes an elongate support member extending from the support mast. The elongate support member has a longitudinal axis. The bicycle carrier includes a fork crown cradle disposed along the elongate support member. The fork crown cradle includes a first rod portion extending angularly relative to the longitudinal axis of the elongate support member. The fork crown cradle includes a second rod portion extending angularly relative to the longitudinal axis of the elongate support member. The fork crown cradle includes at least one tine extending angularly relative to the longitudinal axis of the elongate support member.

There is additionally provided a bicycle carrier according to a further aspect. The bicycle carrier includes a support mast. The bicycle carrier includes an elongate support member extending from the support mast. The elongate support member has a longitudinal axis. The bicycle carrier includes a fork crown cradle disposed along the elongate support member. The fork crown cradle includes at least one member protruding angularly relative to the longitudinal axis of the elongate support member. The fork crown cradle includes one or more rods protruding angularly relative to the longitudinal axis of the elongate support member. The at least one member and the one or more rods are spaced-apart so as to allow a fork crown of a bicycle to be received by the fork crown cradle.

The bicycle carrier disclosed herein may be used to transport, by vehicle, any bicycle with a front fork, encompassing virtually all known bicycle designs. The carrier design allows the quick and convenient loading and unloading of bicycles, without the need to remove any bicycle to access another. Furthermore the design provides an efficient way to carry as many bicycles as possible, in as little space as possible, by turning the handlebars, thereby preventing interference.

BRIEF DESCRIPTIONS OF DRAWINGS

The invention will be more readily understood from the following description of the embodiments thereof given, by way of example only, with reference to the accompanying drawings, in which.

DESCRIPTIONS OF THE PREFERRED EMBODIMENTS

Figure 1:
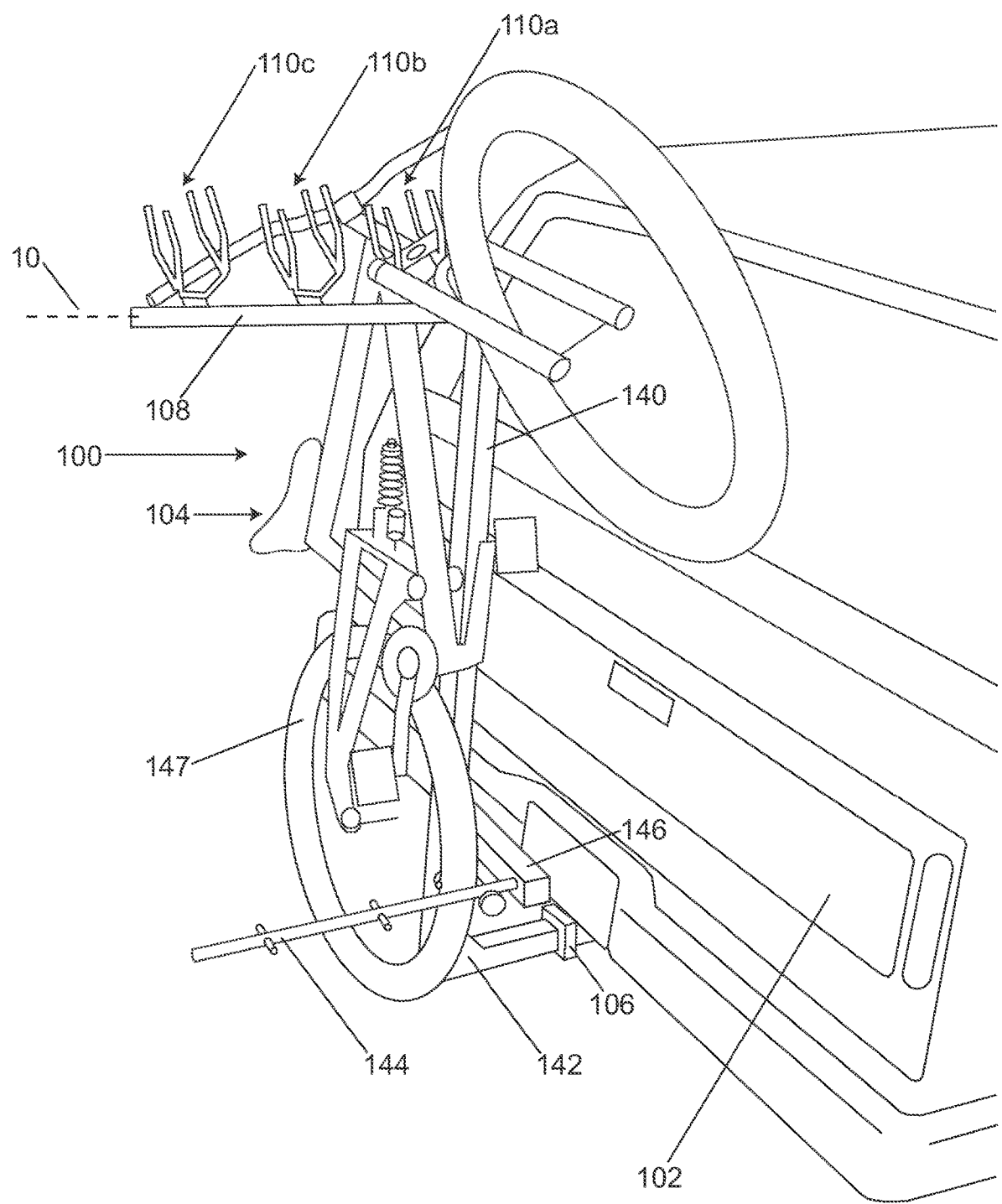
FIG. 1 is a perspective view of an end of a vehicle with a first embodiment of an improved bicycle carrier having a bicycle mounted thereon.

Referring to drawings and first to FIG. 1, there is shown a first embodiment of an improved bicycle carrier 100. The bicycle carrier 100 is mounted on a rear of a vehicle 102 for the convenient transport of at least one bicycle 104. In this example, the bicycle carrier 100 is attached to the vehicle 102 through hitch structure 106 which is mounted to vehicle 102. The bicycle 104 is releasably secured to bicycle carrier 100 for transport by the vehicle 102 and subsequent removal and use at a desired destination.

Figure 2:
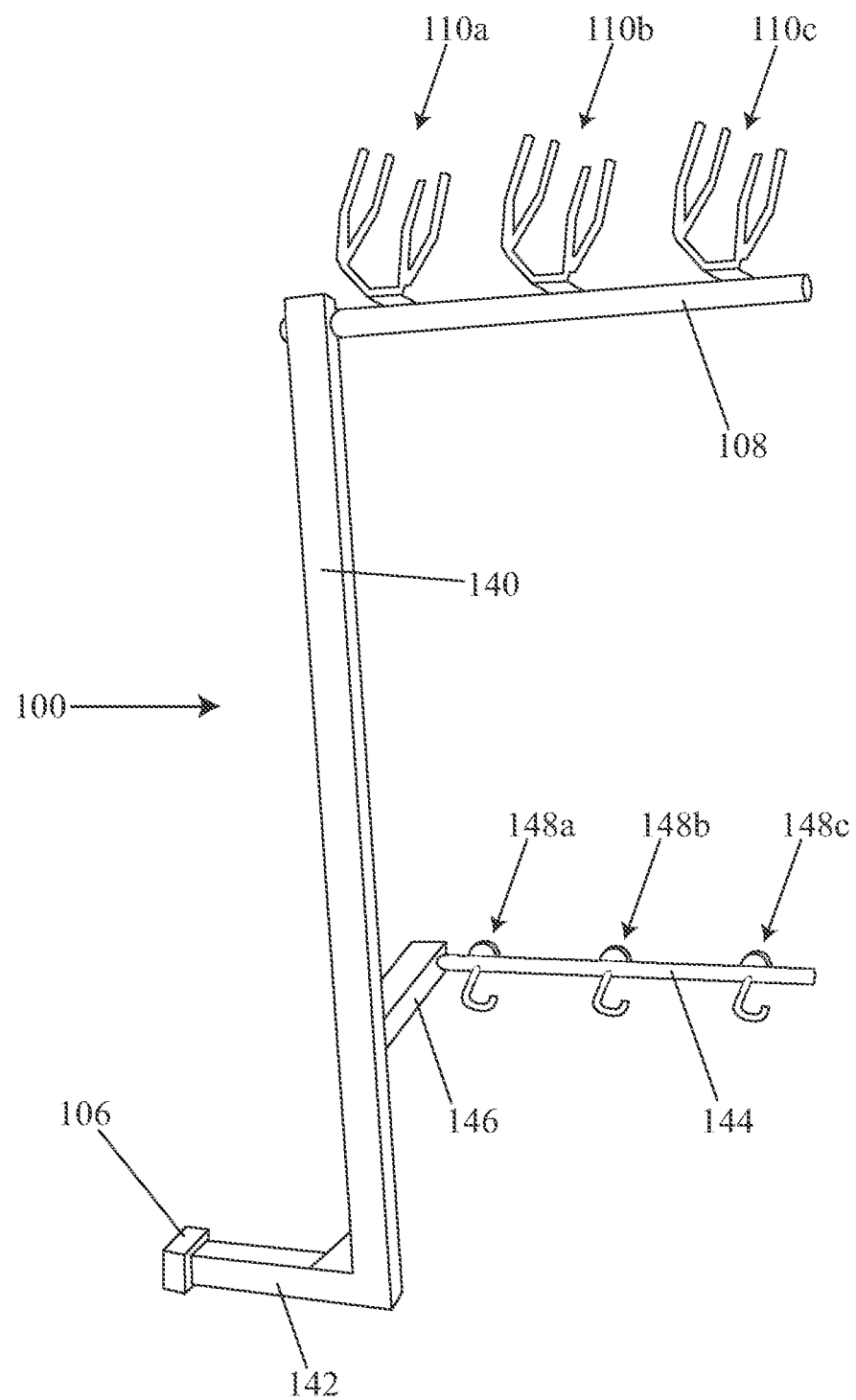
FIG. 2 is a perspective side view of the bicycle carrier of FIG. 1.
Figure 3:
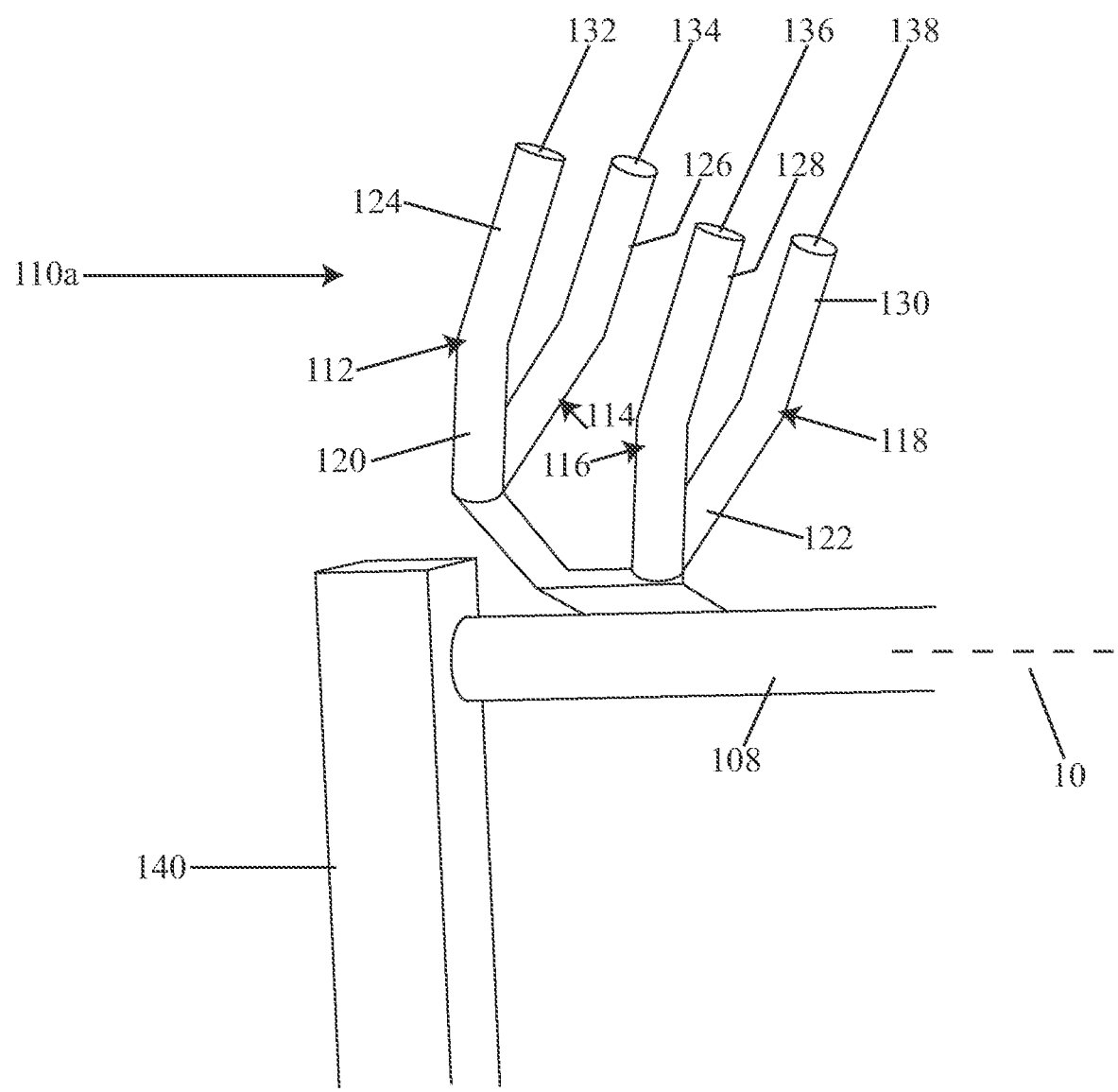
FIG. 3 is a perspective side view of an upper bar and fork crown cradle of the bicycle carrier of FIG. 1.

FIG. 2 shows the bicycle carrier 100 in greater detail. The bicycle carrier 100 has a first elongate support member in the form of a horizontal upper bar 108 with a plurality of fork crown cradles 110a, 110b and 110c disposed thereon. The fork crown cradles are substantially similar in structure and function. Accordingly, only one of the of the fork crown cradles 110a is described in detail herein with the understanding that the other fork crown cradles 110b and 110c have a similar structure and function in a similar manner. The fork crown cradle 110a is shown in greater detail in FIG. 3 and is provided with four tines 112, 114, 116 and 118 which are rods in this example. The tines are approximately five inches in length, paired and arranged in two V-shaped structures 120 and 122, with a V angle of approximately seventy degrees. The V-shaped structures 120 and 122 are spaced approximately four inches apart. Arms 124, 126, 128 and 130 each define a top half of a corresponding tine 112, 114, 116 and 118. The arms are parallel to each other. Each of the tines also has a corresponding free distal end 132, 134, 136 and 138. The fork crown cradle 110a can be set at an angle between zero and ninety degrees with respect to a longitudinal axis 10 of the horizontal upper bar 108.

In this example, the fork crown cradles 110a, 110b and 110c are set at an angle of approximately forty-five degrees from the longitudinal axis 10 of the horizontal upper bar 108. Each fork crown cradle 110a, 110b and 110c is also spaced at a distance from an adjacent fork crown cradle 110a, 110b and 110c to allow the closest possible proximity between bicycles, about seven inches in this example. The horizontal upper bar 108, best shown in FIG. 2, is attached to vertical support mast 140, and the lowermost end of vertical support mast 140 is affixed to a hitch attachment bar 142. The hitch attachment bar 142 is simply slid into the receiver style vehicle hitch structure 106, thereby positioning horizontal upper bar 108 at an approximate right angle to the bumper of vehicle 102 as shown in FIG. 1. In other embodiments, other means of attaching bicycle carrier 100 to the vehicle 102 may be employed, for example, use of a strap system (possibly in combination with hooks) or by connecting bicycle carrier 100 to a roof mount.

Referring back to FIG. 2, at a point on vertical support mast 140 located approximately one bicycle wheelbase length down from horizontal upper bar 108, is a second elongate support member in the form of a rear wheel horizontal stabilizer bar 144. In this example, the rear wheel horizontal stabilizer bar 144 is offset from the horizontal upper bar 108 approximately one half of a bicycle wheel diameter by a stabilizer offset tube 146. J-hook and knob devices 148a, 148b and 148c are spaced-apart approximately equidistantly on rear wheel stabilizer bar 144 and centered with respect to fork crown cradles 110a, 110b and 110c on the horizontal upper bar 108. The J-hook and knob devices 148a, 148b and 148c are simply hooks with threads and a knob on the non-hooked end, which pass through holes in the rear wheel stabilizer bar 144, and are used to secure a bicycle rear wheel 147, as best shown in FIG. 7 for device 148c.

Figure 4:
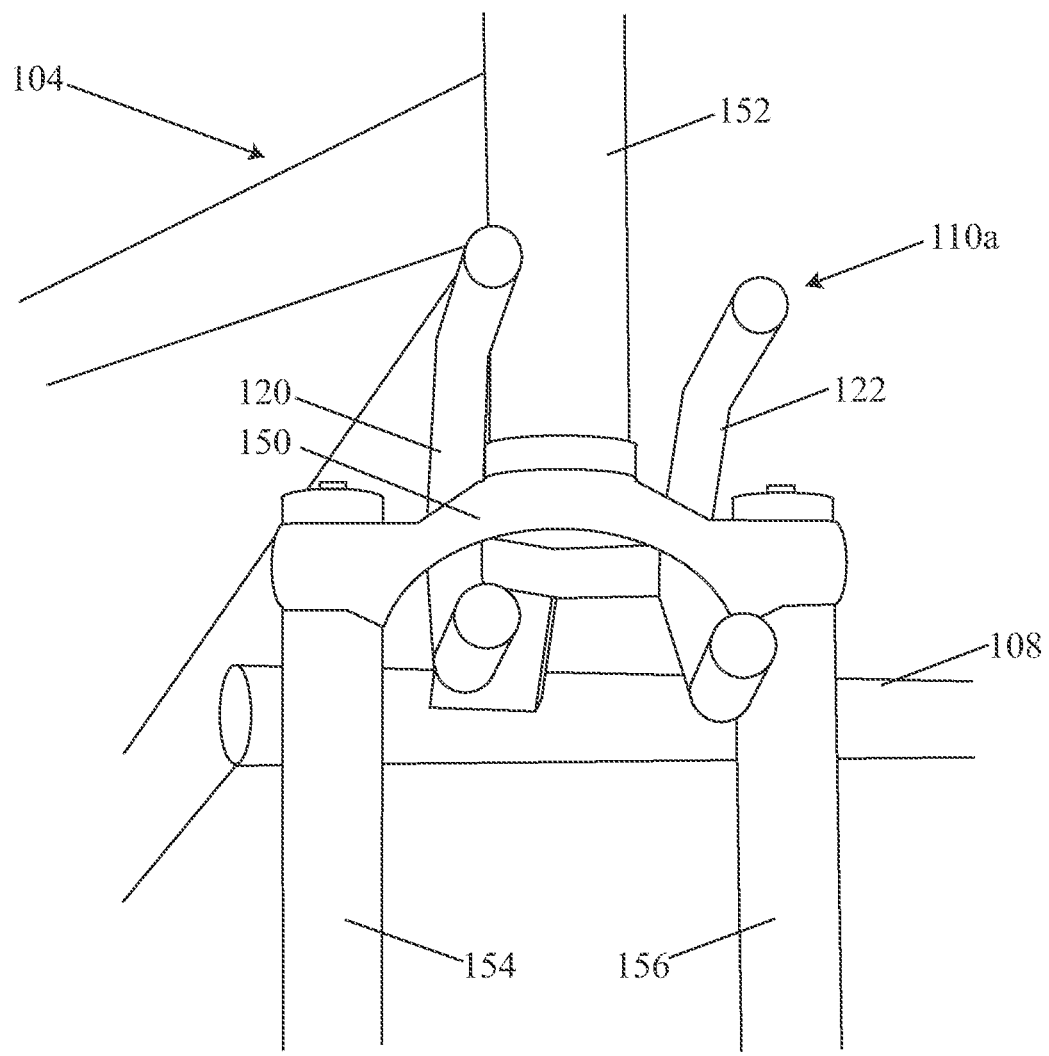
FIG. 4 is a perspective top view showing the fork crown cradle of the bicycle carrier of FIG. 1 engaging a fork crown of the bicycle.
Figure 5:
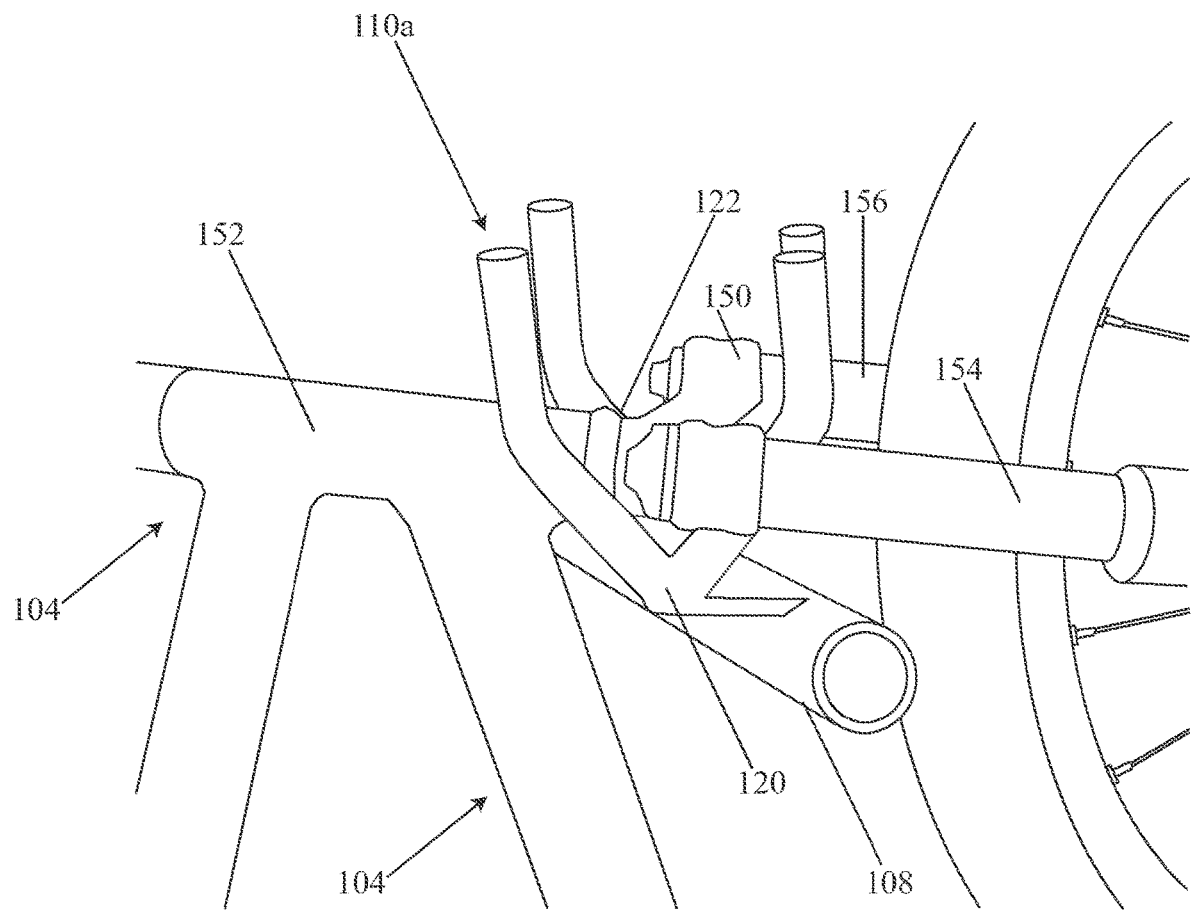
FIG. 5 is a perspective side view showing the fork crown cradle of the bicycle carrier of FIG. 1 engaging the fork crown of the bicycle.

FIG. 4 and FIG. 5 show the fork crown cradle 110a engaging or receiving a bicycle fork crown 150 and bicycle head tube 152. The fork crown 150 extends between the two V-shaped structures 120 and 122. A portion of the fork crown 150 adjacent a first bicycle fork tube 154 is received between a first one of the V-shaped structures 120. A portion of the fork crown 150 adjacent a second bicycle fork tube 156 is received between a second one of the V-shaped structures 122. The bicycle fork tubes 154 and 156 are disposed outside the fork crown cradle 110a. The head tube 152 extends outwardly from the fork crown cradle between the two V-shaped structures 120 and 122.

Figure 6:
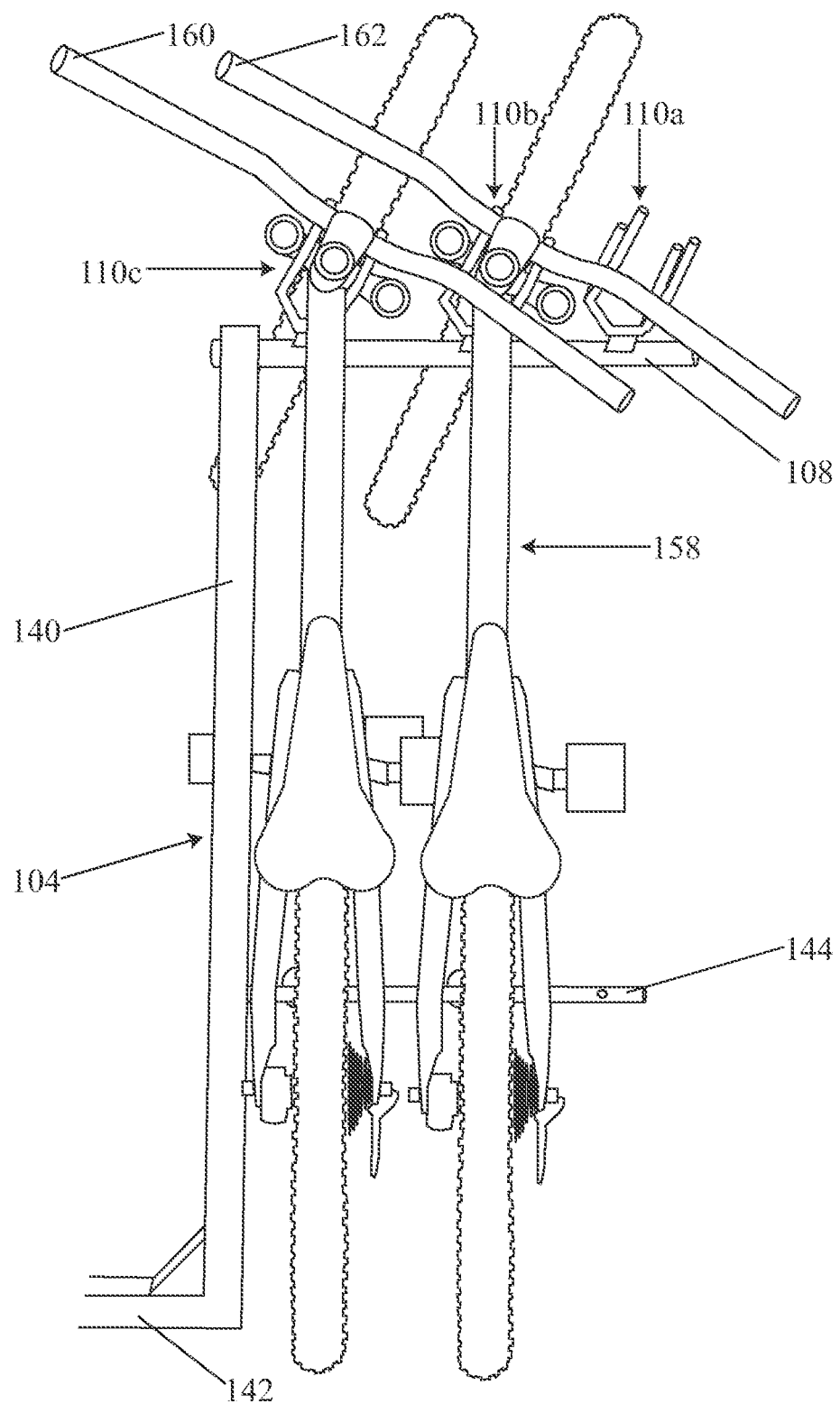
FIG. 6 is a side view showing the bicycle carrier of FIG. 1 with two bicycles mounted thereon in close proximity.

FIG. 6 shows the close mounting of adjacent bicycles 104 and 158 facilitated by the fork crown cradles 110b and 110c each being set at an angle of approximately forty-five degrees from the horizontal upper bar 108. This angle inherently turns the bicycle fork and more specifically the handlebars 160 and 162 to approximately the same angle, thereby eliminating interference with another bicycle's handlebars, mounted to an adjacent fork crown cradle.

Figure 7:
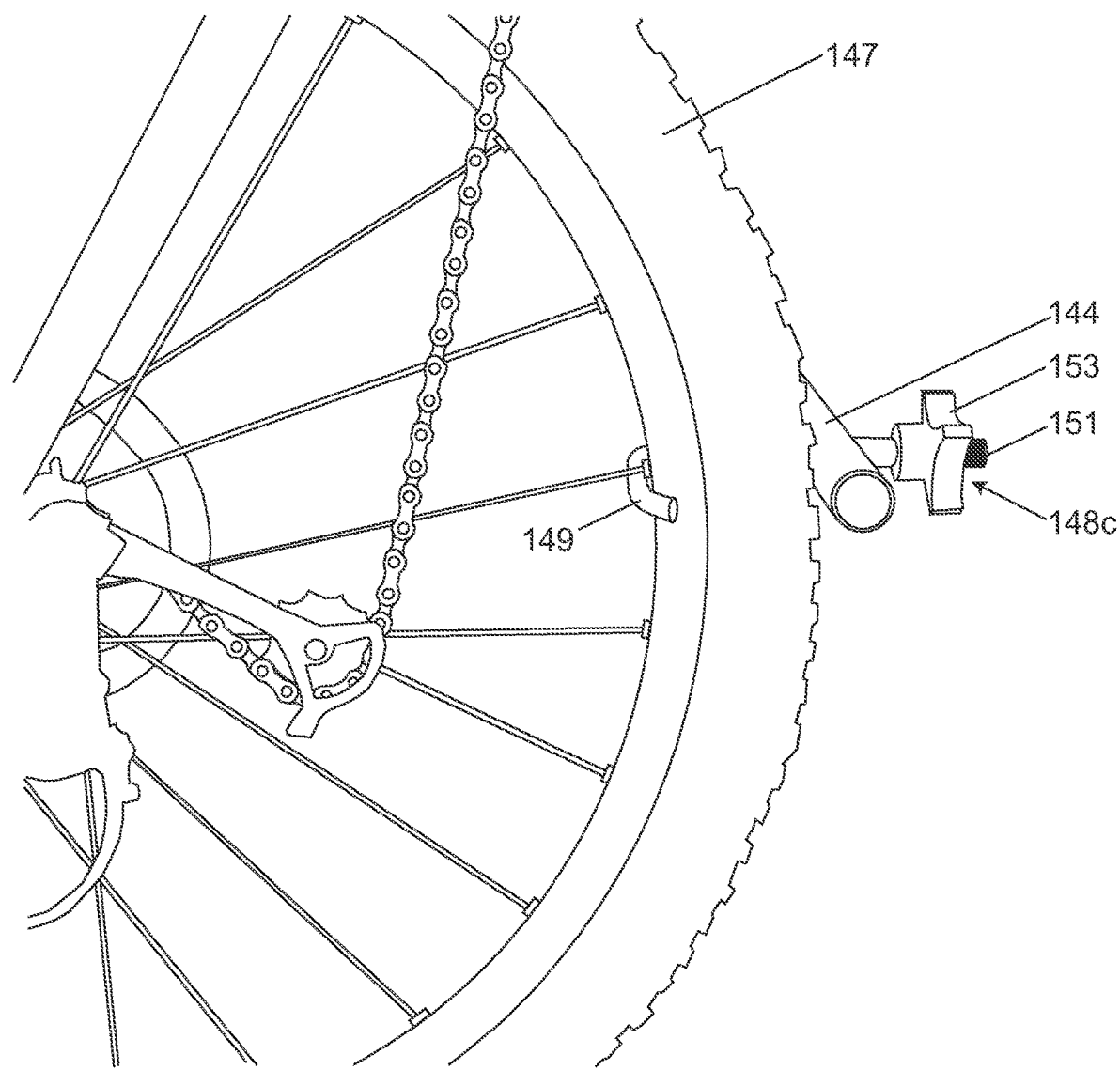
FIG. 7 is a fragmentary side view showing a bicycle rear wheel secured to a rear wheel stabilizer bar of the bicycle carrier of FIG. 1 by a J-hook and knob device.

FIG. 7 shows how the rear wheel 147 of a bicycle is secured against the rear wheel stabilizer bar 144 by a J-hook and knob device 148c. The J-hook and knob device 148c consist of a hooked metal rod 149 mounted through a hole in the rear wheel stabilizer bar 144. The straight end 151 is threaded with a knob 153 attached. The rear wheel 147 of the bicycle is simply hooked by the J-hook and tightened against the rear wheel stabilizer bar 144 by the knob.

Figure 8:
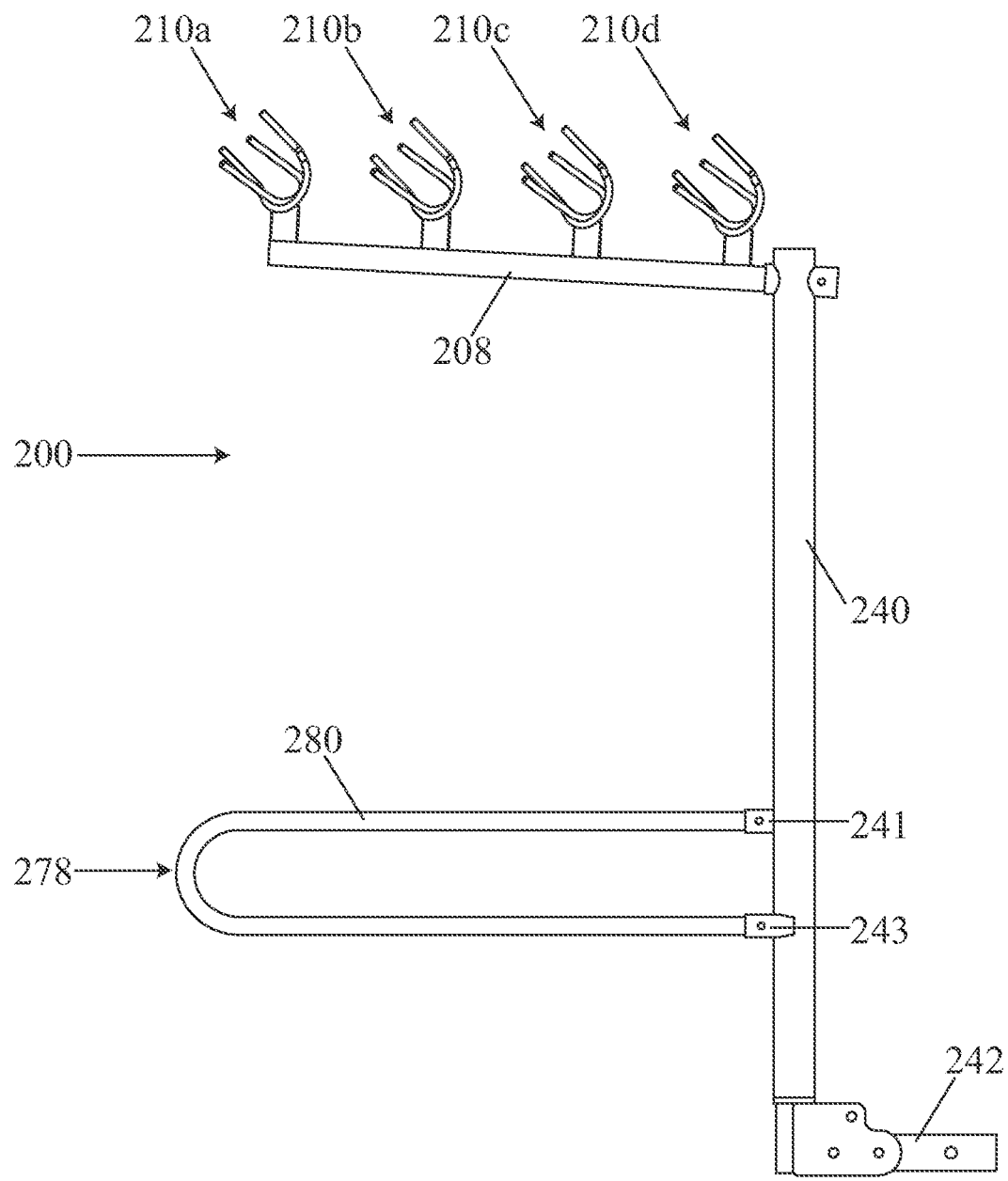
FIG. 8 is a perspective view of a second embodiment of an improved bicycle carrier.
Figure 9:
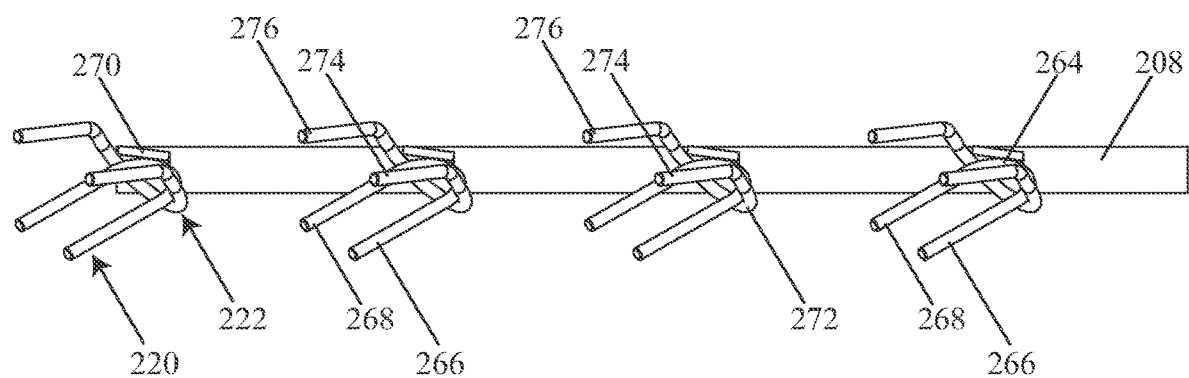
FIG. 9 is a perspective top view of an upper bar and fork crown cradles of the bicycle carrier of FIG. 8.
Figure 10:
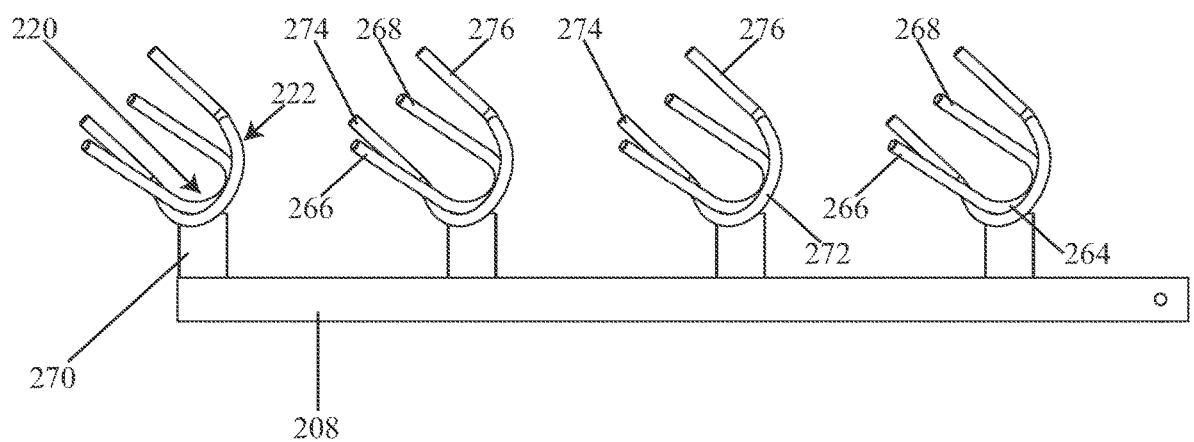
FIG. 10 is a perspective side view of the upper bar and fork crown cradles of the bicycle carrier of FIG. 8.
Figure 11:
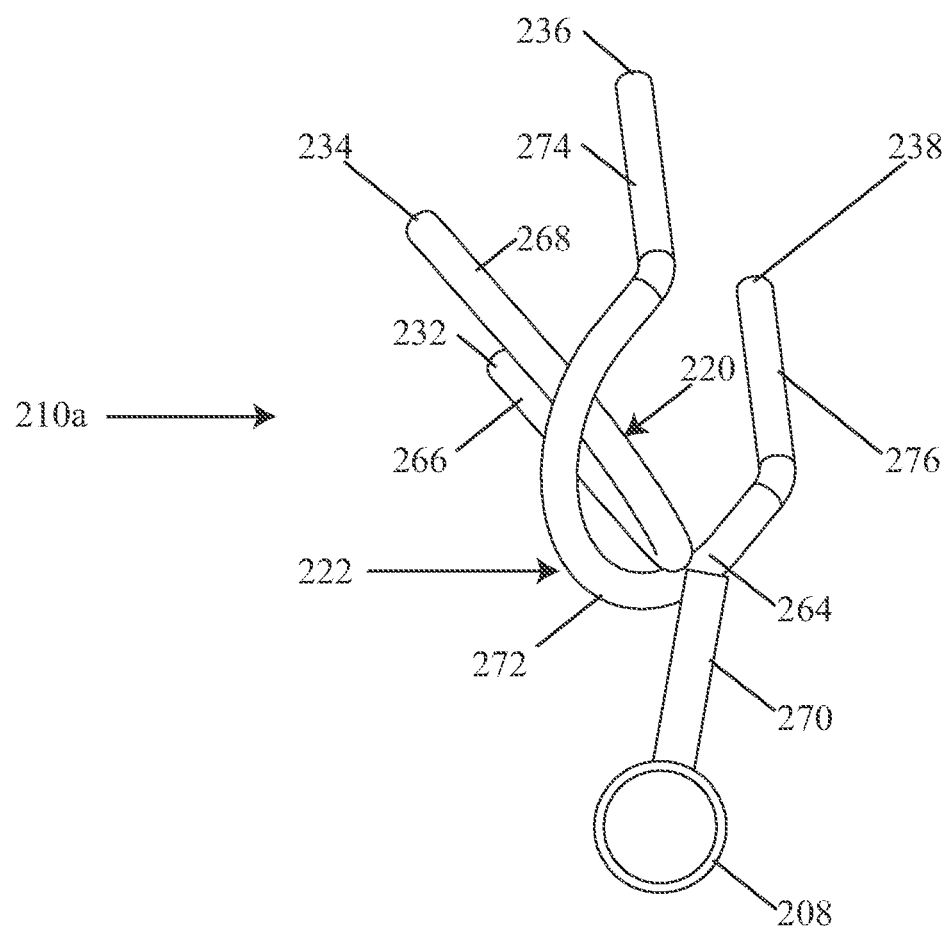
FIG. 11 is a perspective end view the upper bar and a single fork crown cradle of the bicycle carrier of FIG. 8.

A second embodiment of an improved bicycle carrier 200 is shown in FIGS. 8 to 11. As shown in FIG. 8, the second embodiment of the bicycle carrier 200 has an upper horizontal bar 208 with a plurality of fork crown cradles 210a, 210b, 210c and 210d disposed thereon. The fork crown cradles are substantially similar in structure and function. Accordingly, only one of the of the fork crown cradles 210a is described in detail herein with the understanding that the other fork crown cradles 210b, 210c and 210d have a similar structure and function in a similar manner. The fork crown cradle 210a is shown in greater detail in FIG. 11 and is provided with two pairs 220 and 222 of tines which are rods in this example. An inside pair 220 of tines forms a U-shaped base 264 with arms 266 and 268 extending outwardly therefrom. The U-shaped base is connected to an attachment member 270 such that a lower arm 266 of the inside pair 220 of tines is at an approximate forty-five degree angle to the horizontal upper bar 208.

An outside pair 222 of the tines forms a U-shaped base 272 with arms 274 and 276 extending angularly therefrom. The arms 274 and 276 of the outside pair 222 of tines are positioned adjacent to, but outside the arms 266 and 268 of the inside pair 220 of tines. The U-shaped base 272 of the outside pair 222 of tines is secured to the lower arm 266 of the inside pair 220 of tines. Each of the arms 266, 268, 274 and 276 of the fork crown cradle 210a has a corresponding free distal end 232, 234, 236 and 238. The fork crown cradle 210a, of the second embodiment of the bicycle carrier 200, engages or receives a fork crown in a substantially similar manner as fork crown cradle 110a, of the first embodiment 100 of the bicycle carrier 100, and is compatible with most styles of bicycle forks. However, the fork crown cradle of the second embodiment of the bicycle carrier may be simpler to manufacture than the fork crown of the first embodiment of the bicycle carrier.

Referring back to FIG. 8, the second embodiment of the bicycle carrier 200 also has a generally U-shaped support member 278 which extends horizontally, i.e. perpendicularly, from a vertical support mast 240 and is connected to the support mast 240 at two points 241 and 243. The support member 278, when in use, prevents a rear wheel of a bicycle from riding up and over upper horizontal bar 208 thereby preventing the bicycle from moving upwards and off fork crown cradles tines 210a, 210b, 210c and 210d. An upper horizontal bar 280 of support member 278 functions in a similar manner as a wheel chock. A tie may also be used to secure a rear wheel of a bicycle to the support member 278. There is also a hitch attachment bar 242 to allow the bicycle carrier to be mounted on a vehicle.

Figure 12:
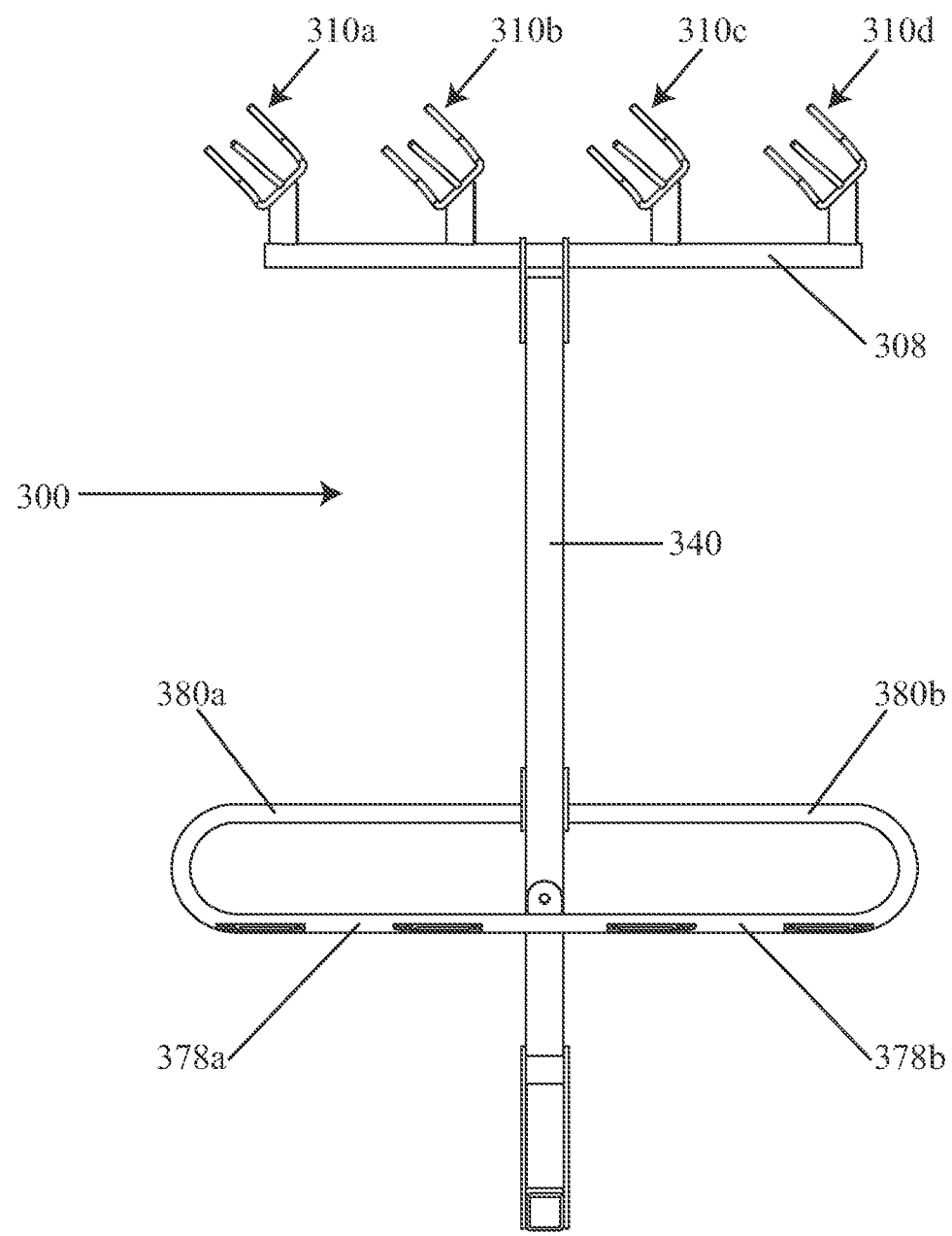
FIG. 12 is a perspective side view of a third embodiment of an improved bicycle carrier.
Figure 13:
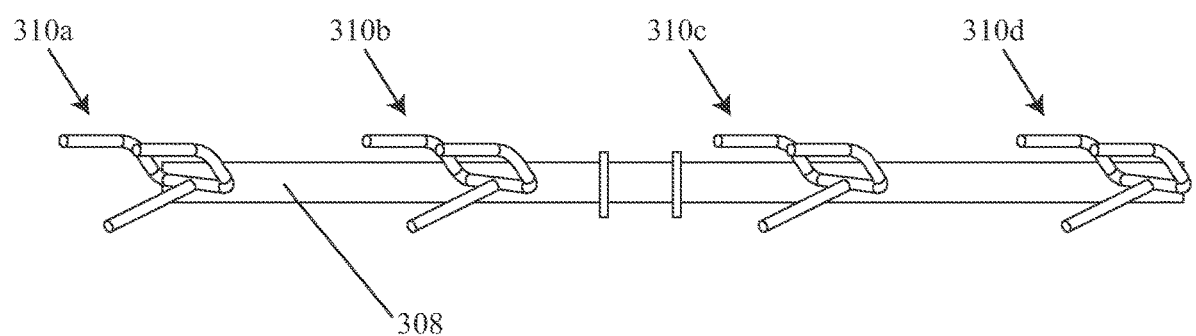
FIG. 13 is a top view of an upper bar and fork crown cradles of the bicycle carrier of FIG. 12.
Figure 14:
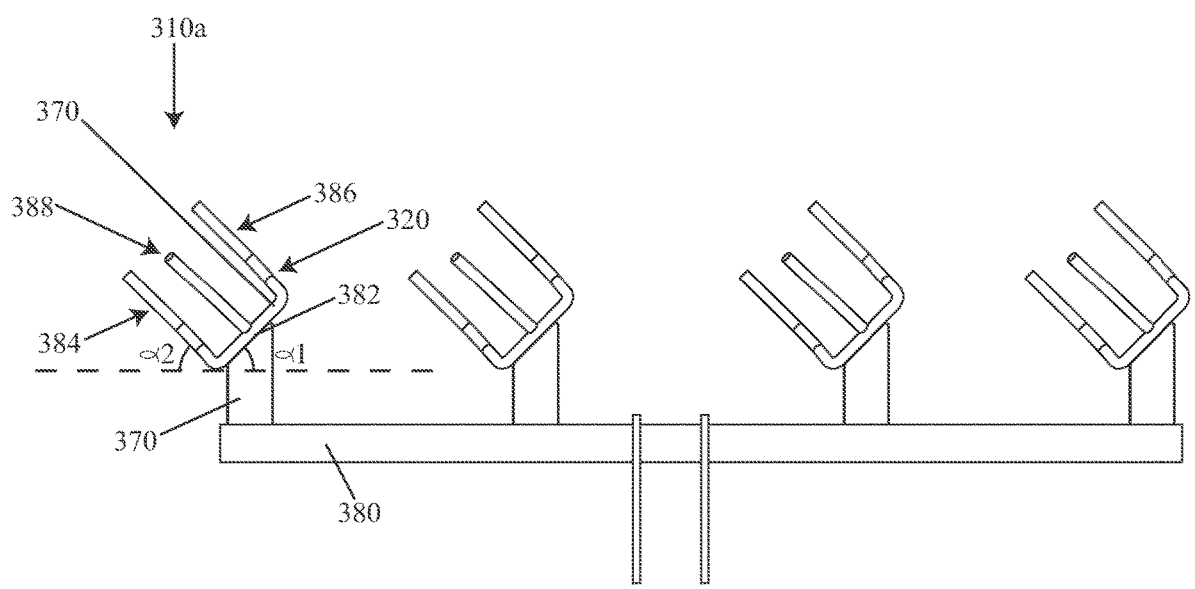
FIG. 14 is a side view of the upper bar and fork crown cradles of the bicycle carrier of FIG. 12.

A third embodiment of an improved bicycle carrier 300 is shown in FIGS. 12 to 19. As shown in FIG. 12, the third embodiment of the bicycle carrier 300 has a first elongate support member in the form of an upper horizontal bar 308 with a plurality of fork crown cradles 310a, 310b, 310c and 310d disposed thereon. The fork crown cradles are substantially similar in structure and function. Accordingly, only one of the fork crown cradles 310a is described in detail herein with the understanding that the other fork crown cradles 310b, 310c and 310d have a similar structure and function in a similar manner. As best shown in FIG. 14, the fork crown cradle 310a is connected to the upper horizontal bar 308 by an attachment member 370. The attachment member 370 has a sloped edge 382 which extends at angle $\alpha_1$ relative to the upper horizontal bar 308. In this example, the angle $\alpha_1$ is forty-five degrees. The fork crown cradle 310a is mounted on the sloped edge of 382 of the attachment member 370 and is accordingly angled relative to the upper horizontal bar at an angle $\alpha_2$ which, in this example, would also be forty-five degrees. In other examples angles $\alpha_1$ and $\alpha_2$ may be any suitable or desired angles.

Figure 15:
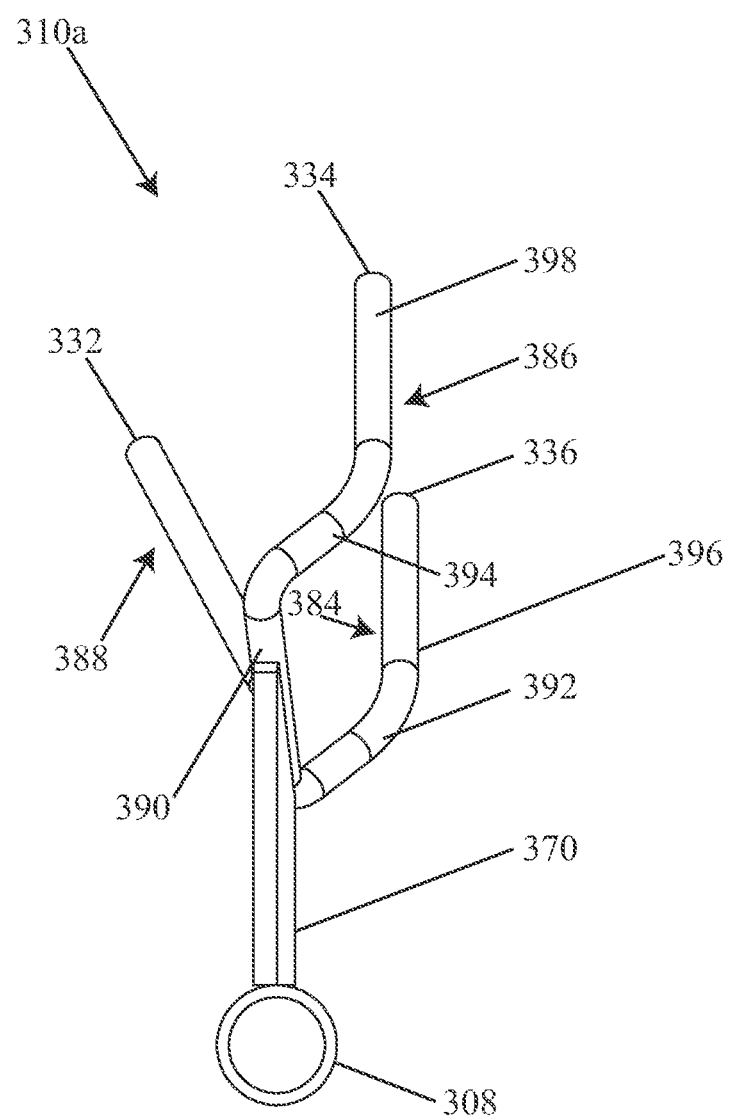
FIG. 15 is an end view the upper bar and a single fork crown cradle of the bicycle carrier of FIG. 12.

The fork crown cradle 310a is shown in greater detail in FIG. 15 and is provided with three tines 384, 386 and 388 which are rods in this example and extend away from the horizontal upper bar 308. Two of the tines 384 and 386 extend from opposite ends of mounting rod 390 which is secured to the attachment member 370. Together the mounting rod 390 and the pair of tines 384 and 386 form a generally U-shaped structure 320 as best shown in FIG. 14. Referring back to FIG. 15, the tines 384 and 386 each includes a corresponding generally curved portion 392 and 394. The curved portions are disposed along the mounting rod 390 and extend between the mounting rod 390 and corresponding parallel arms 396 and 398 of each of the tines 384 and 386. The curved portions form a cradle to receive a bicycle fork as will be discussed in greater detail below. The third tine 388 is disposed between the pair of tines 384 and 386 and extends from the mounting rod 390 angularly away from the pair of tines 384 and 386. In this example, the third tine 388 is a straight rod. Each of the tines has a corresponding distal free end 332, 334 and 336.

Figure 16:
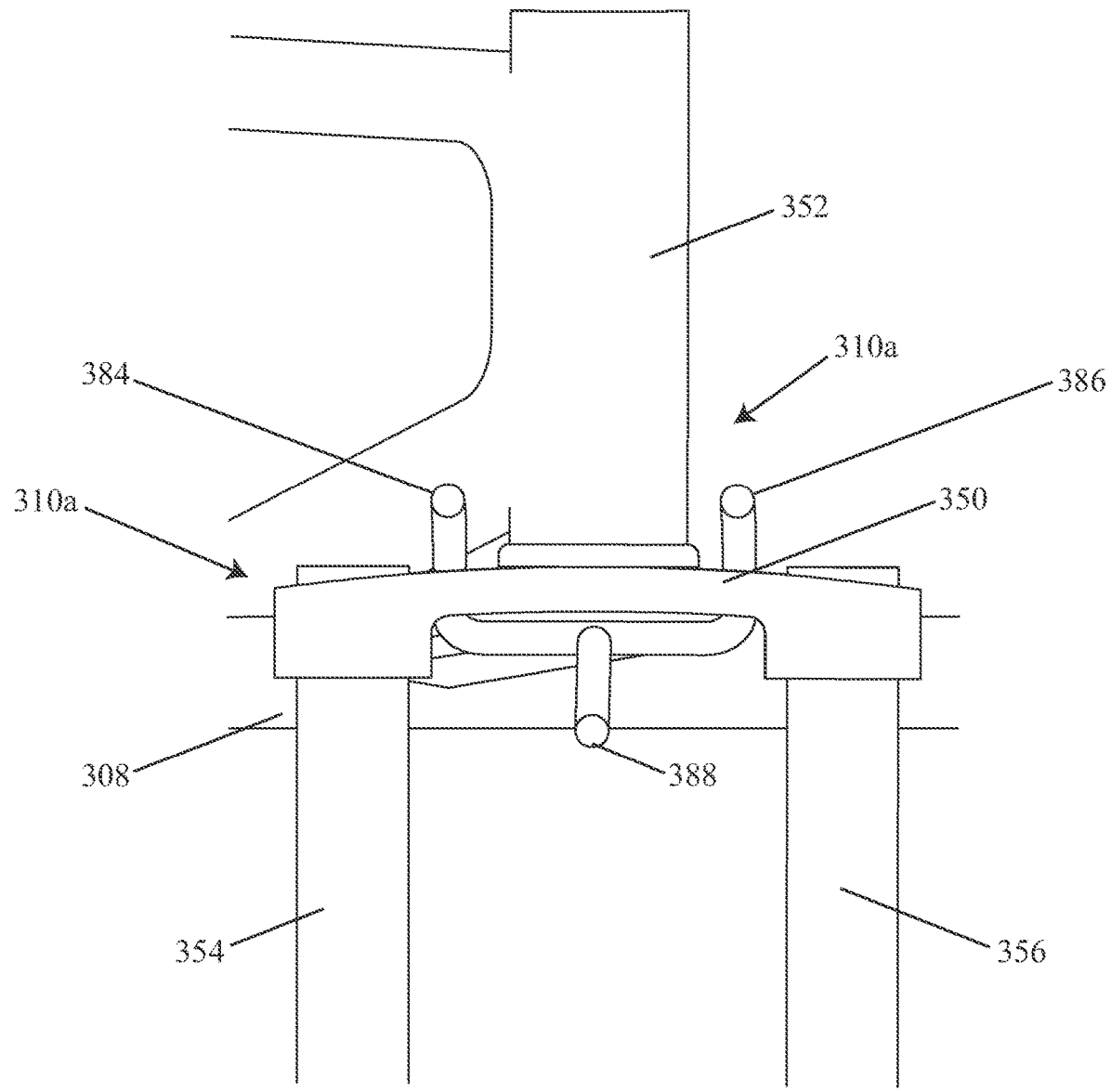
FIG. 16 is a fragmentary top view showing the fork crown cradle of the bicycle carrier of FIG. 12 engaging a fork crown of the bicycle.
Figure 17:
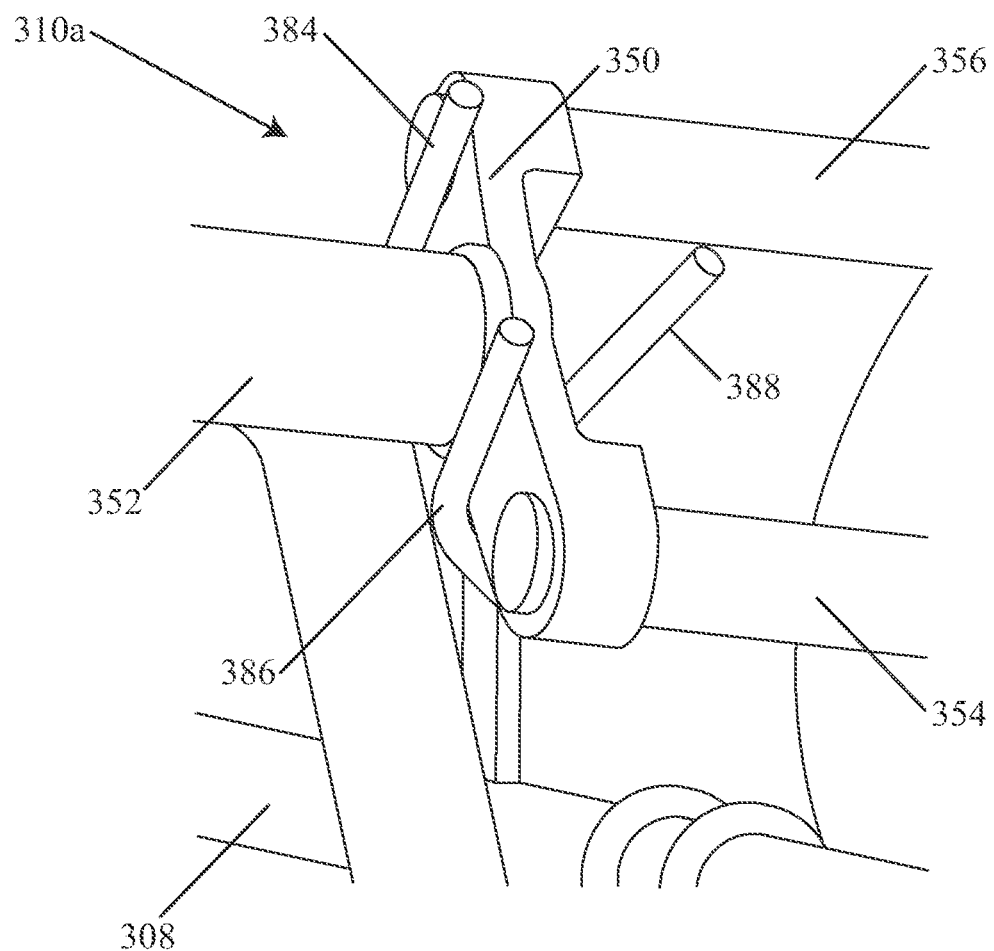
FIG. 17 is a fragmentary side view showing the fork crown cradle of the bicycle carrier of FIG. 12 engaging the fork crown of the bicycle.

FIG. 16 and FIG. 17 show the fork crown cradle 310a engaging or receiving a bicycle fork crown 350 and bicycle head tube 352. The fork crown 350 is disposed between the pair of tines 384 and 386 and the third tine 388, i.e. the pair of tines are on an opposite side of the fork crown from the third tine. The head tube 352 extends outwardly from the fork crown cradle 350 between the pair of tines 384 and 386. Bicycle fork tubes 354 and 356 are disposed on opposite sides of the third tine 388. In this example, since the fork crown cradle 310a is set at an angle of approximately forty-five degrees relative to the upper horizontal bar 308, the fork crown 350 will inherently turn approximately forty-five degrees. More importantly, as shown in FIG. 18 and FIG. 19, the handlebars 362 of a mounted bicycle 358 will also inherently turn approximately forty-five degrees from their center positions, thereby eliminating interference with another bicycle's handlebars (not shown) mounted on an adjacent fork crown cradle.

Referring back to FIG. 12, the third embodiment of the bicycle carrier 300 also has a pair of generally U-shaped support members 378a and 378b which extend horizontally, i.e. perpendicularly, from opposite sides of a vertical support mast 340. Each of the U-shaped support members 378a and 378b is connected to an opposite side of the support mast 340 at two points. The support members 378a and 378b, when in use, prevent a rear wheel of a bicycle from riding up and over upper horizontal bar 308, thereby preventing the bicycle from moving upwards and off of fork crown cradles 310a, 310b, 310c and 310d. Upper horizontal bars 380a and 380b of support members 378a and 378b function in a similar manner as a wheel chock. This is best shown in FIG. 18 and FIG. 19. A tie (not shown) may also be used to secure the rear wheel 347 of the bicycle 358 to one of the support member 378a. Alternatively, the rear wheel 347 may be secured to the other one of the support members 378b.

Figure 18:
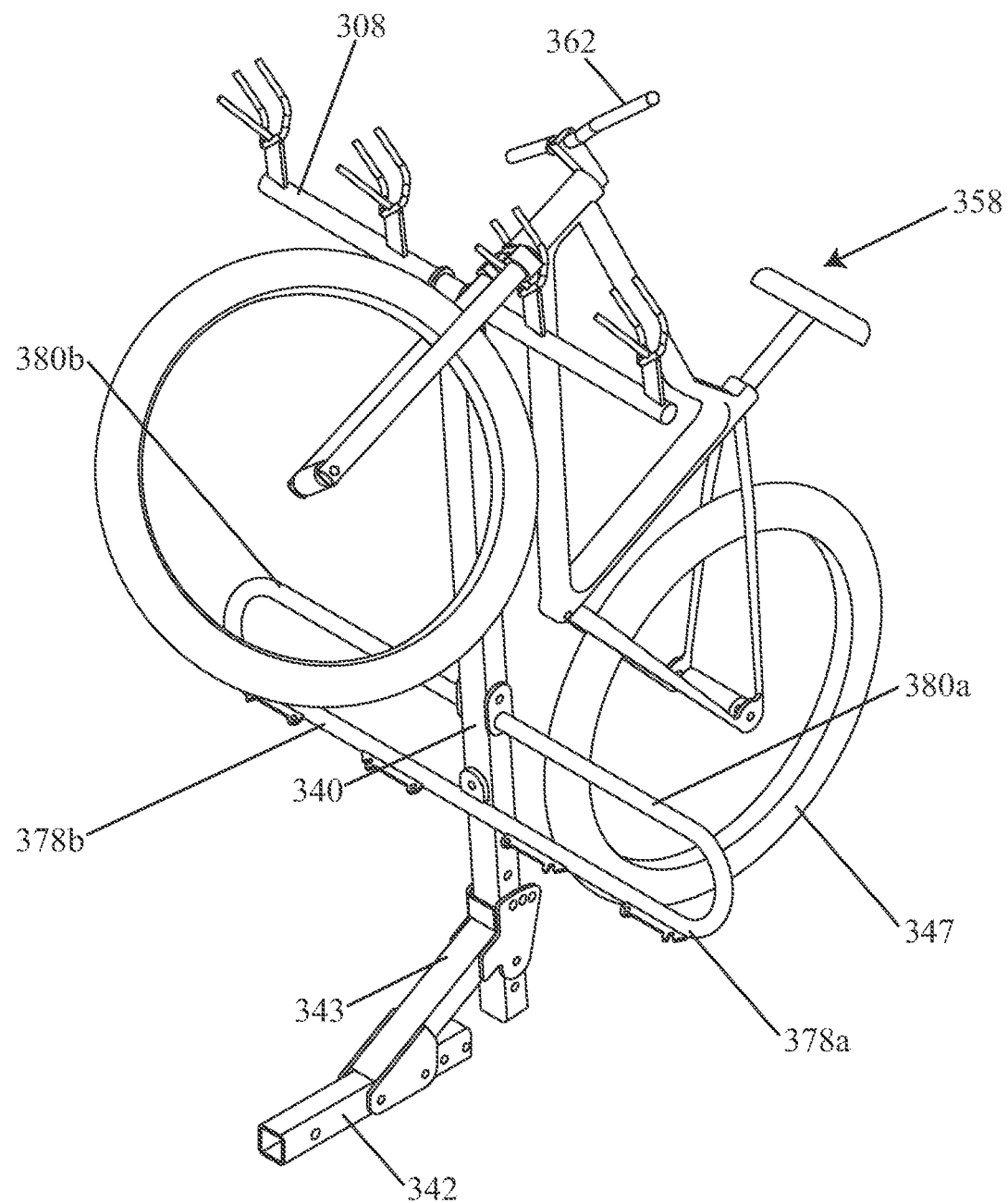
FIG. 18 is a perspective view of the bicycle carrier of FIG. 12 with a bicycle mounted thereon.
Figure 19:
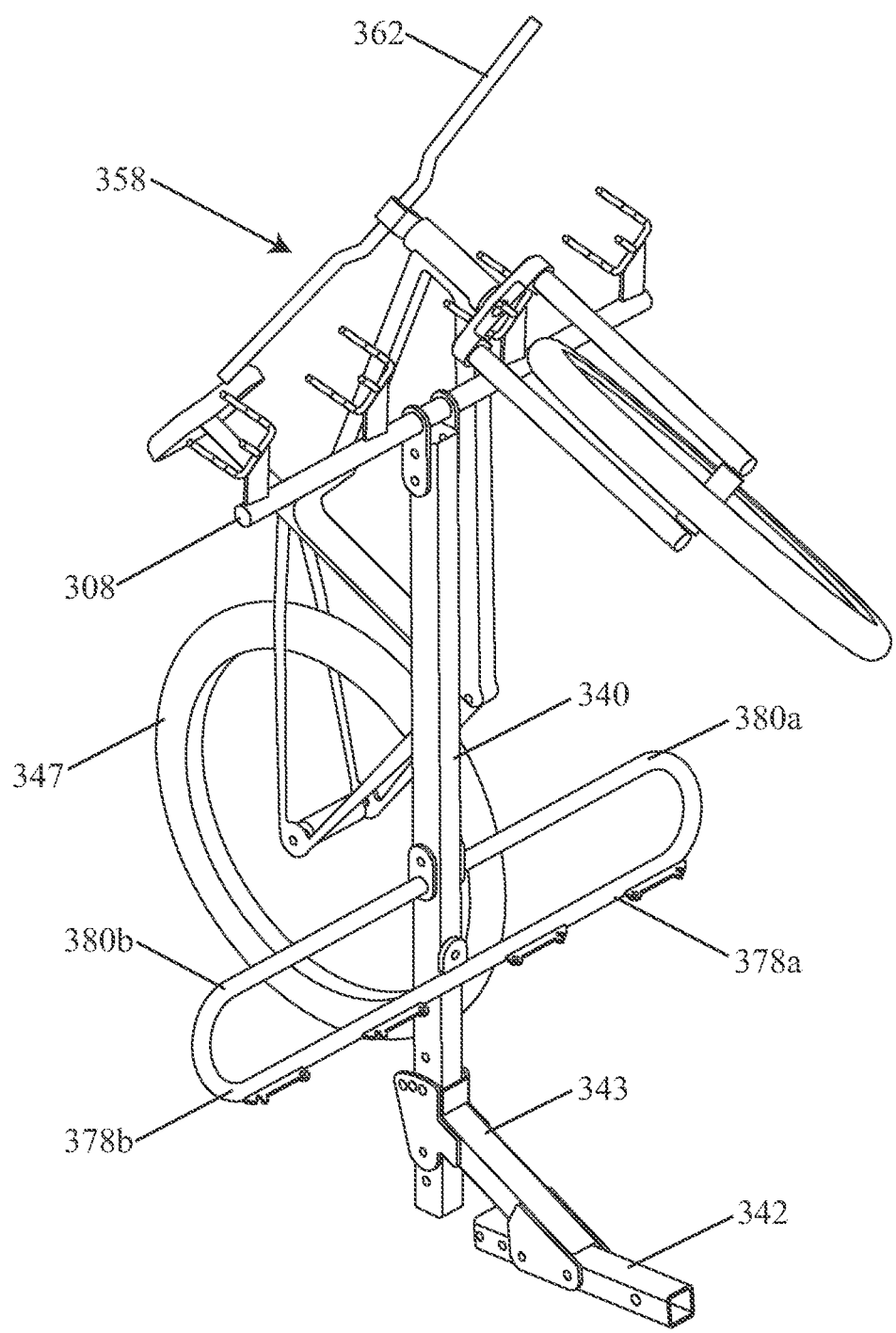
FIG. 19 is another perspective view of the bicycle carrier of FIG. 12 with a bicycle mounted thereon.

The third embodiment of the bicycle carrier 300 is also provided with a hitch attachment bar 342, shown in FIG. 18, to allow the bicycle carrier to be mounted on a vehicle. However, in the embodiment of FIG. 18, a link 343 connects the hitch attachment bar 342 to the support mast 340. In this example, the link 343 is pivotably connected to both the support mast 340. This allows the support mast 340 to extend at varying angles relative to the hitch attachment bar. In other examples, the link 343 may be pivotably connected to the attachment bar 342 or to both the support mast 340 and attachment bar 342.

Figure 20:
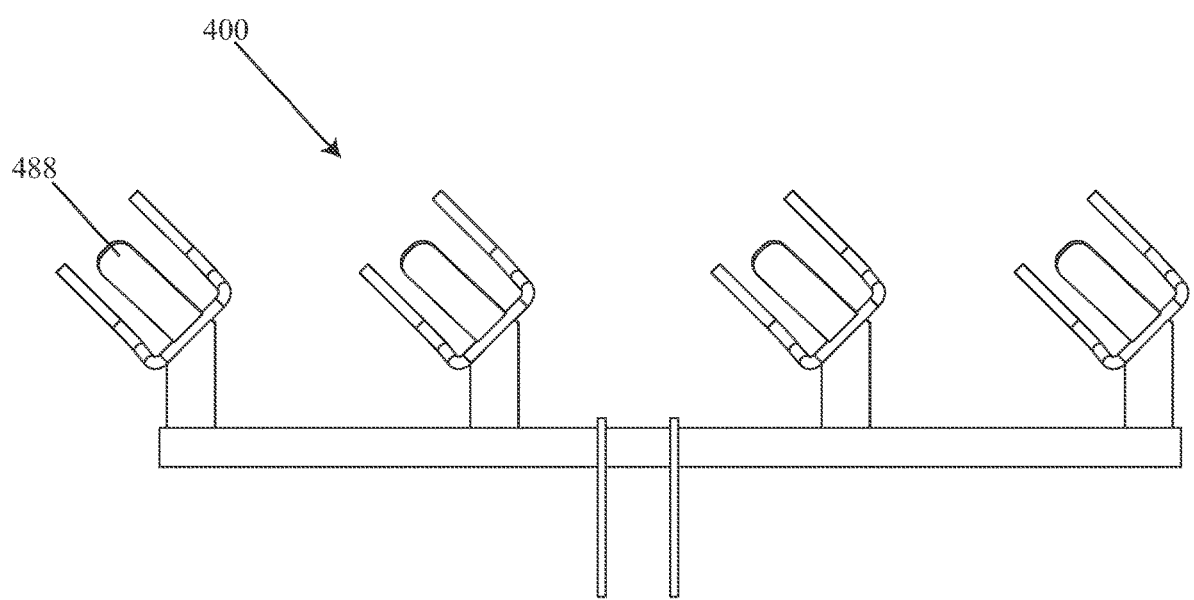
FIG. 20 is a top view of an upper bar and fork crown cradles of a fourth embodiment of an improved the bicycle carrier.
Figure 21:
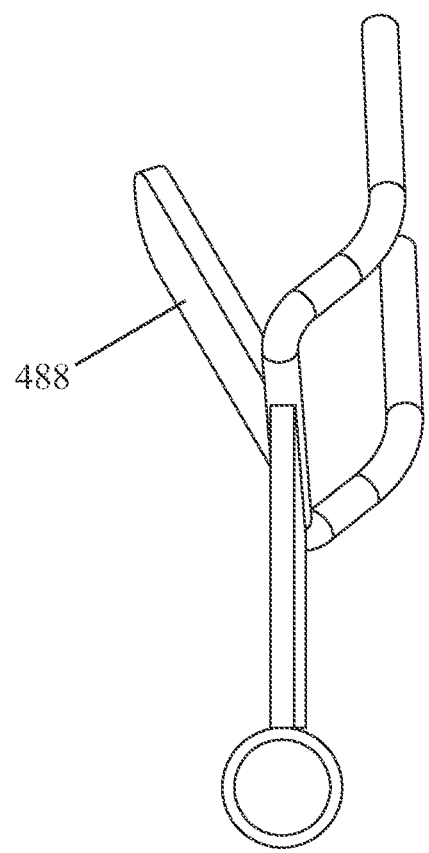
FIG. 21 is a perspective side view of the upper bar and fork crown cradles of the fourth embodiment of the improved bicycle carrier.

A fourth embodiment of an improved bicycle carrier 400 is shown in FIG. 20 and FIG. 21. The fourth embodiment of the bicycle carrier 400 is identical in structure and function to the third embodiment 300 of the bicycle carrier with the exception that in the fourth embodiment of the bicycle carrier the third tine 488 is a planar member or plate.

Figure 22:
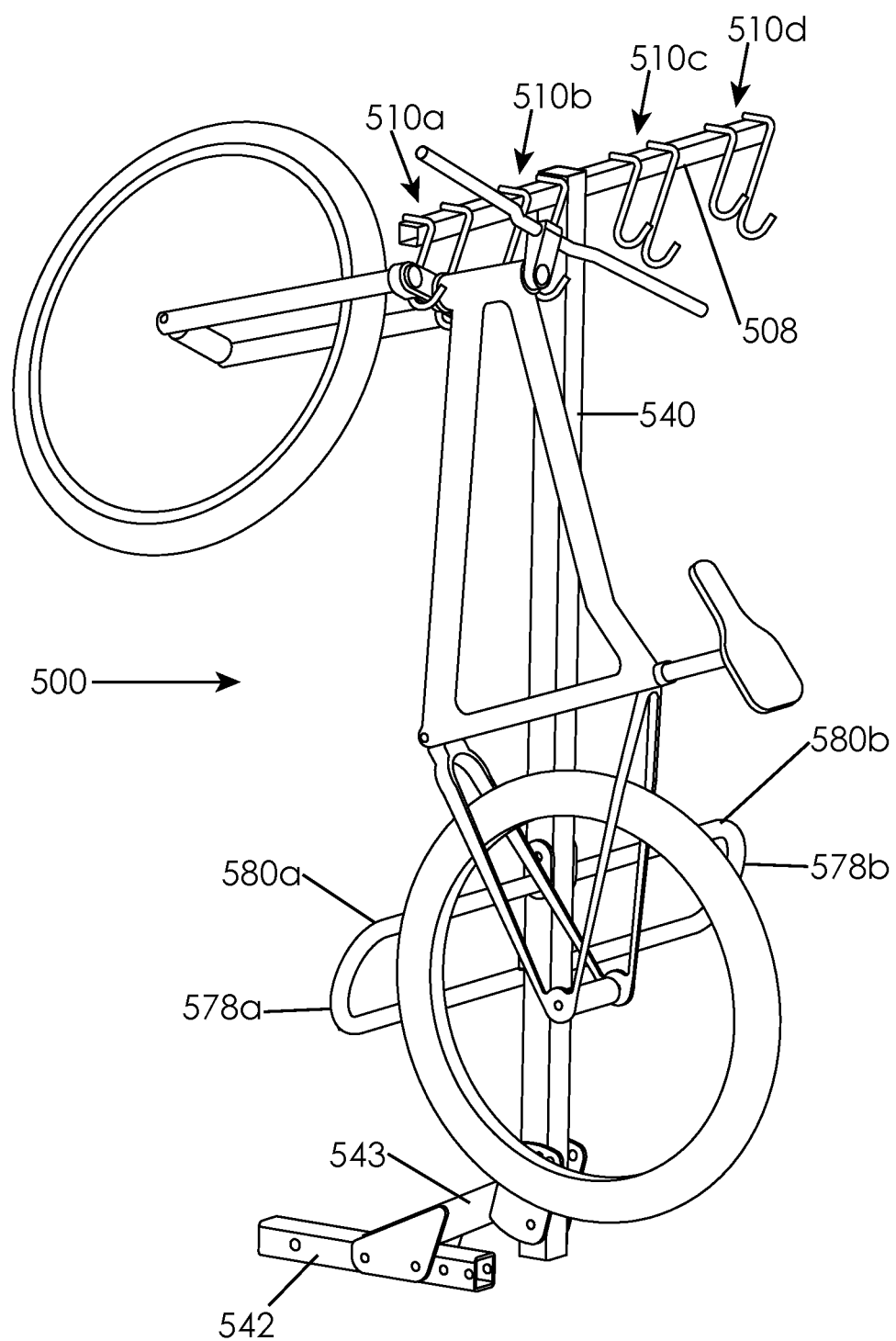
FIG. 22 is a perspective side view of a fifth embodiment of an improved bicycle carrier.
Figure 23:
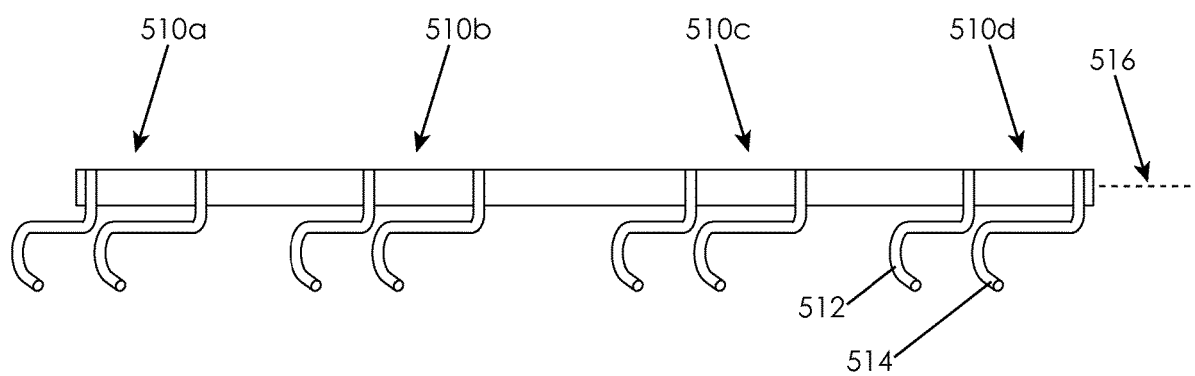
FIG. 23 is a top view of an upper bar and fork crown cradles of the bicycle carrier of FIG. 22.
Figure 24:
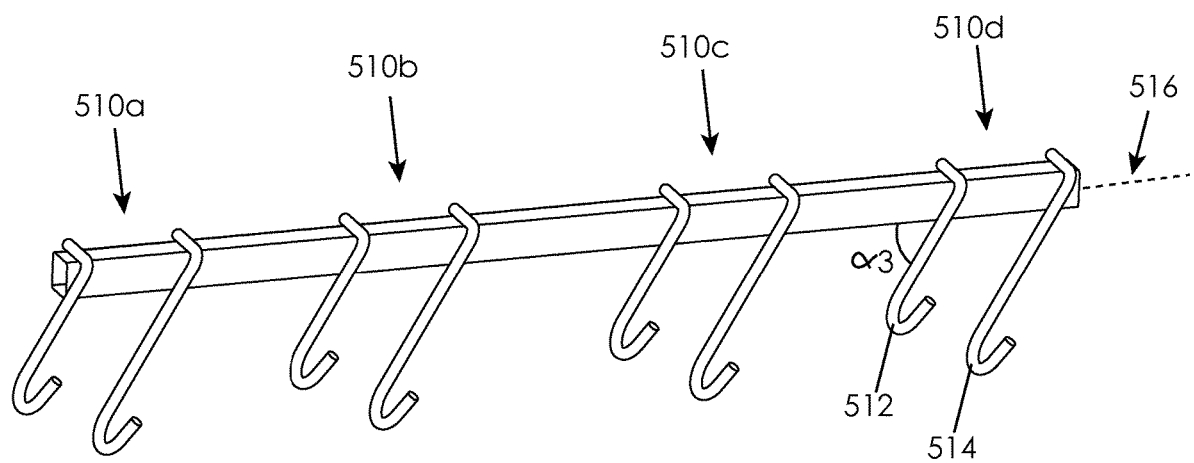
FIG. 24 is a side view of the upper bar and fork crown cradles of the bicycle carrier of FIG. 22.

A fifth embodiment of an improved bicycle carrier 500 is shown in FIGS. 22 to 28. As shown in FIG. 22, the fifth embodiment of the bicycle carrier 500 has a first elongate support member in the form of an upper horizontal bar 508 with a plurality of fork crown cradles 510a, 510b, 510c and 510d disposed thereon. The fork crown cradles are substantially similar in structure and function. Accordingly, only one of the fork crown cradles 510d is described in detail herein with the understanding that the other fork crown cradles 510a, 510b and 510c have a similar structure and function in a similar manner. As best shown in FIGS. 23 and 24, the fork crown cradle 510d includes a pair hook members which, in this example, are a pair of spaced-apart substantially J-hook shaped members 512 and 514. The J-hook shaped members 512 and 514 extend angularly from the upper horizontal bar member 508 and are oblique relative to a longitudinal axis 516 of the upper horizontal bar member. In this example, the J-hook shaped members 512 and 514 extend at an angle of approximately forty-five degrees relative the longitudinal axis 516 of the upper horizontal bar member 508 as shown by angle $\alpha_3$ in FIG. 24 for one of the J-shaped members 512 of the fork crown cradle 510d. In other examples angle $\alpha_3$ may be any suitable or desired angle.

Figure 25:
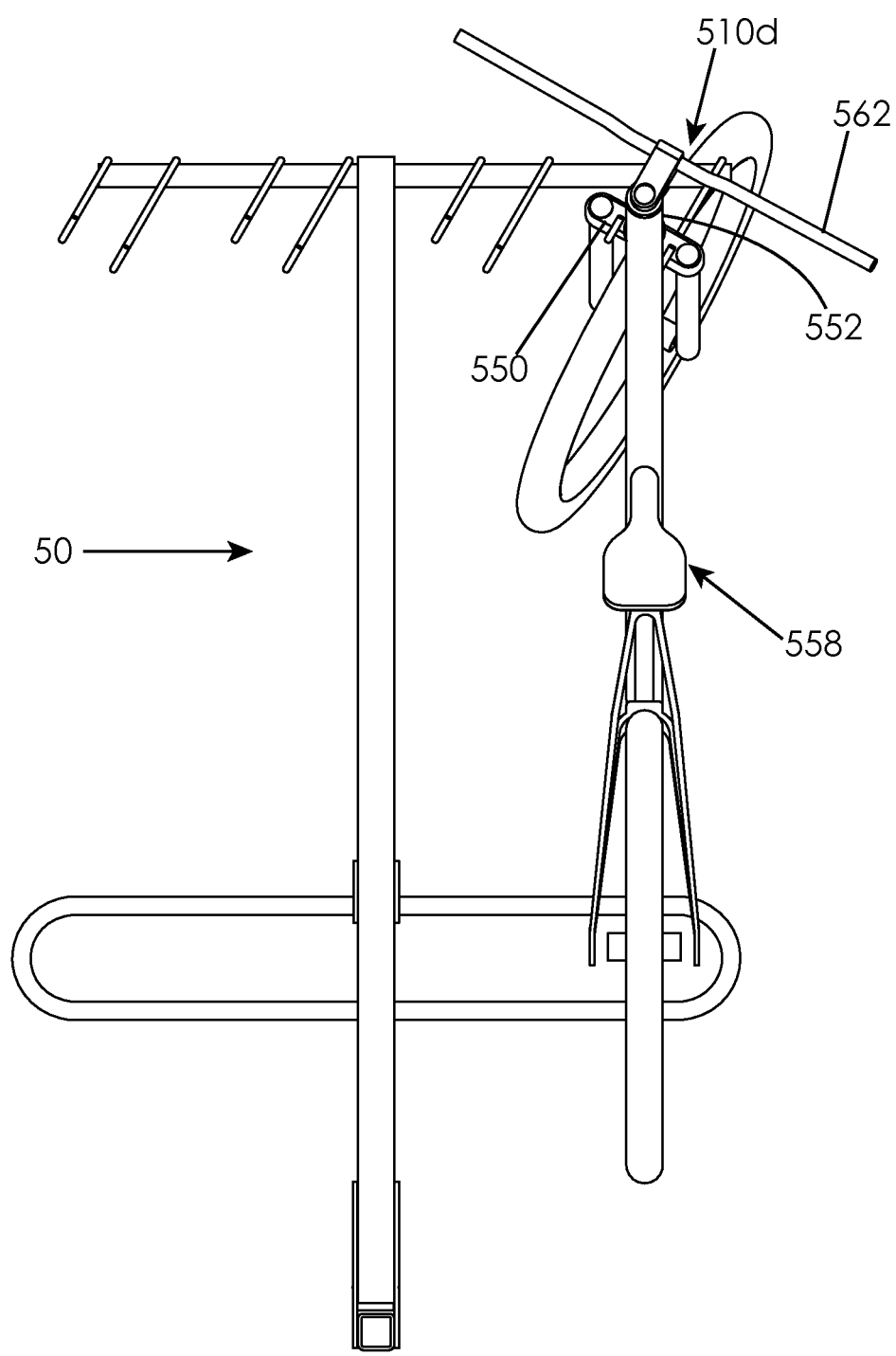
FIG. 25 is a front elevation view of the bicycle carrier of FIG. 22 with a bicycle mounted thereon.
Figure 26:
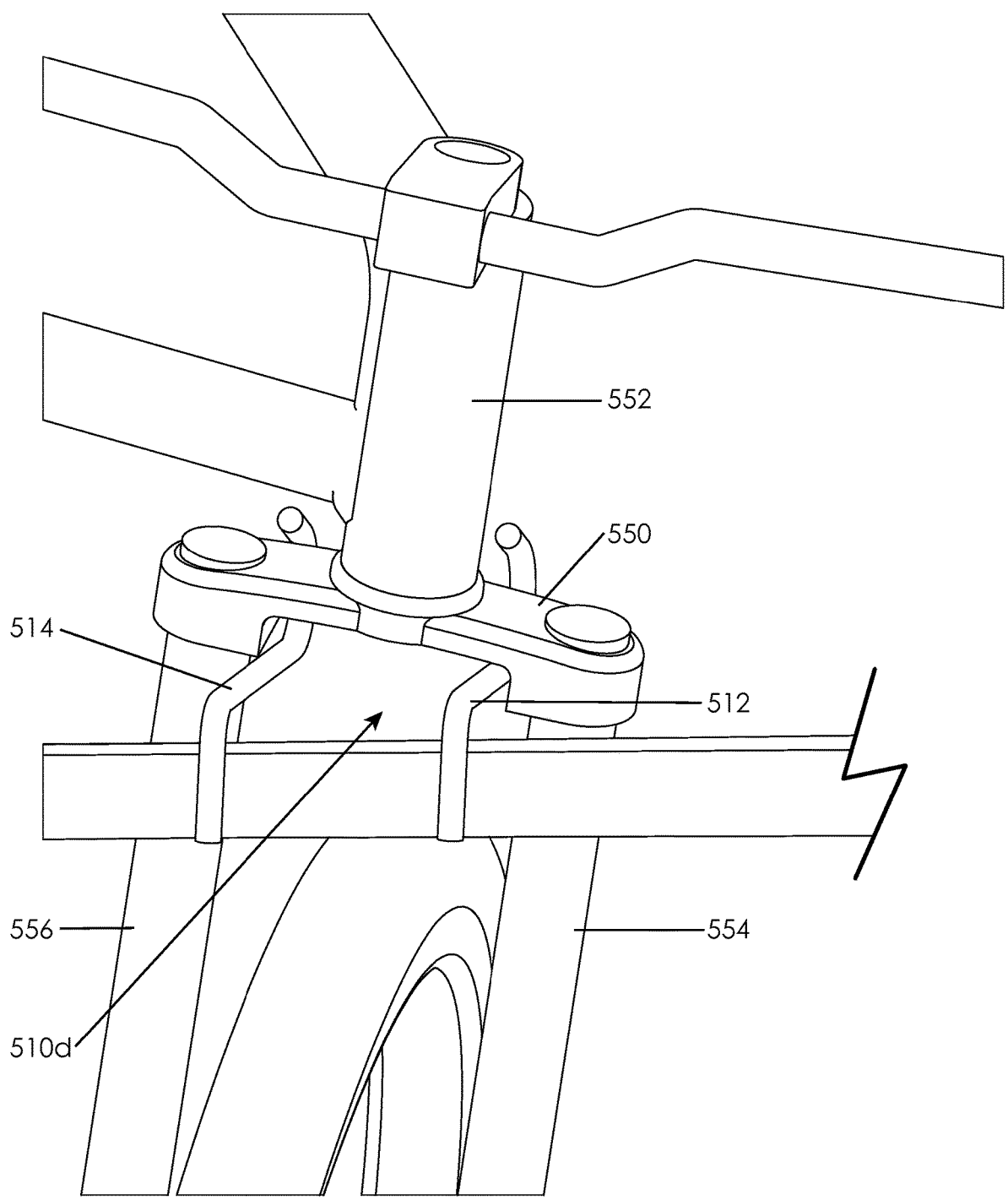
FIG. 26 is a fragmentary top view showing the fork crown cradle of the bicycle carrier of FIG. 22 engaging a fork crown of the bicycle.
Figure 27:
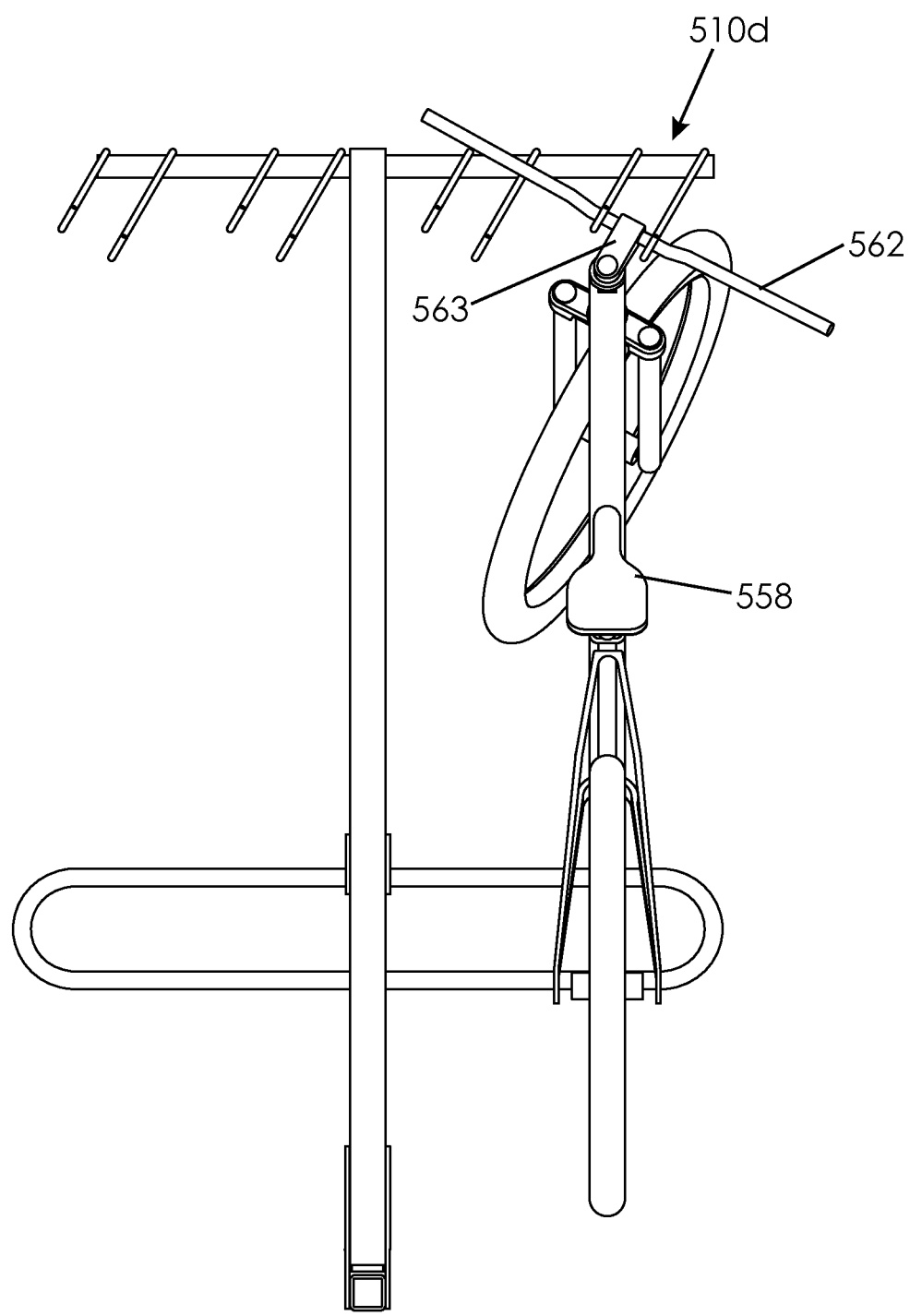
FIG. 27 is another front elevation view of the bicycle carrier of FIG. 22 with a bicycle mounted thereon.
Figure 28:
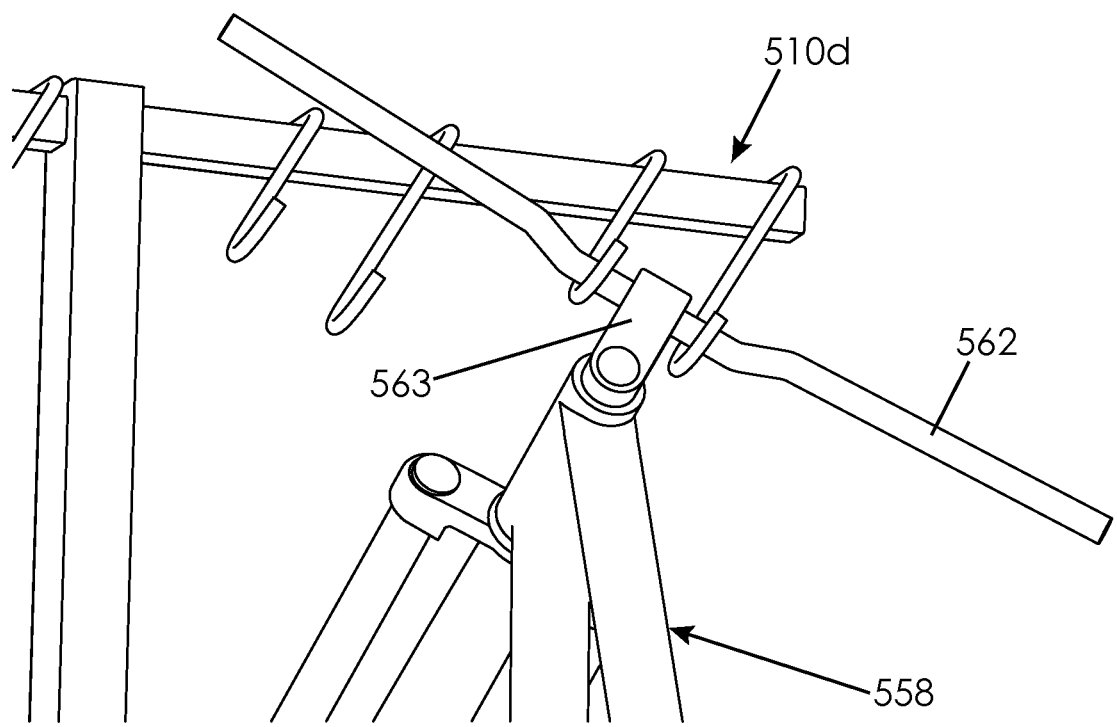
FIG. 28 is a fragmentary top view showing the fork crown cradle of the bicycle carrier of FIG. 22 engaging a handlebar crown of the bicycle.

FIGS. 25 and 26 show the fork crown cradle 510d engaging or receiving a bicycle crown fork 550 and a bicycle head tube 552. FIG. 27 best shows how the fork crown 550 is received by fork crown cradle 510d. The head tube 552 extends outwardly from the fork crown cradle 510d between the J-hooked shaped members 512 and 514 while the J-hooked shaped members 512 and 514 are disposed between the fork tubes 554 and 556. In this example, since the fork crown cradle 510d is set at an angle of approximately forty-five degrees relative to the upper horizontal bar 508, the fork crown 550 will inherently turn approximately forty-five degrees. More importantly, as best shown in FIG. 25, the handlebars 562 of a mounted bicycle 558 will also inherently turn approximately forty-five degrees from their center positions, thereby eliminating interference with another bicycle's handlebars (not shown) mounted on an adjacent fork crown cradle. The fork crown cradle 510d may also receive the handlebars 562 of the mounted bicycle 558 as shown in FIGS. 27 and 28. A handle bar stem 563 extends outwardly from the fork crown cradle between the J-hooked shaped members 512 and 514 when the fork crown cradle 510d receives the handlebars 562. This also causes the handlebars 562 of the mounted bicycle 558 to inherently turn approximately forty-five degrees from their center positions, thereby eliminating interference with another bicycle's handlebars (not shown) mounted on an adjacent fork crown cradle.

Referring back to FIG. 22, the fifth embodiment of the bicycle carrier 500 also has a second elongate support member in the form of a pair of generally U-shaped support members 578a and 578b which extend horizontally, i.e. perpendicularly, from opposite sides of a vertical support mast 540. Each of the U-shaped support members 578a and 578b is connected to an opposite side of the support mast 540 at two points. The support members 578a and 578b, when in use, prevent a rear wheel of a bicycle from riding up and over upper horizontal bar 508, thereby preventing the bicycle from moving upwards and off of fork crown cradles 510a, 510b, 510c and 510d. Upper horizontal bars 580a and 580b of support members 578a and 578b function in a similar manner as a wheel chock. A link 543 connects a hitch attachment bar 542 to the vertical support mast 540. In this example, the link 543 is pivotably connected to both the support mast 540. This allows the support mast 540 to extend at varying angles relative to the hitch attachment bar 542. In other examples, the link 543 may be pivotably connected to the hitch attachment bar 542 or to both the support mast 540 and attachment bar 542.

Figure 29:
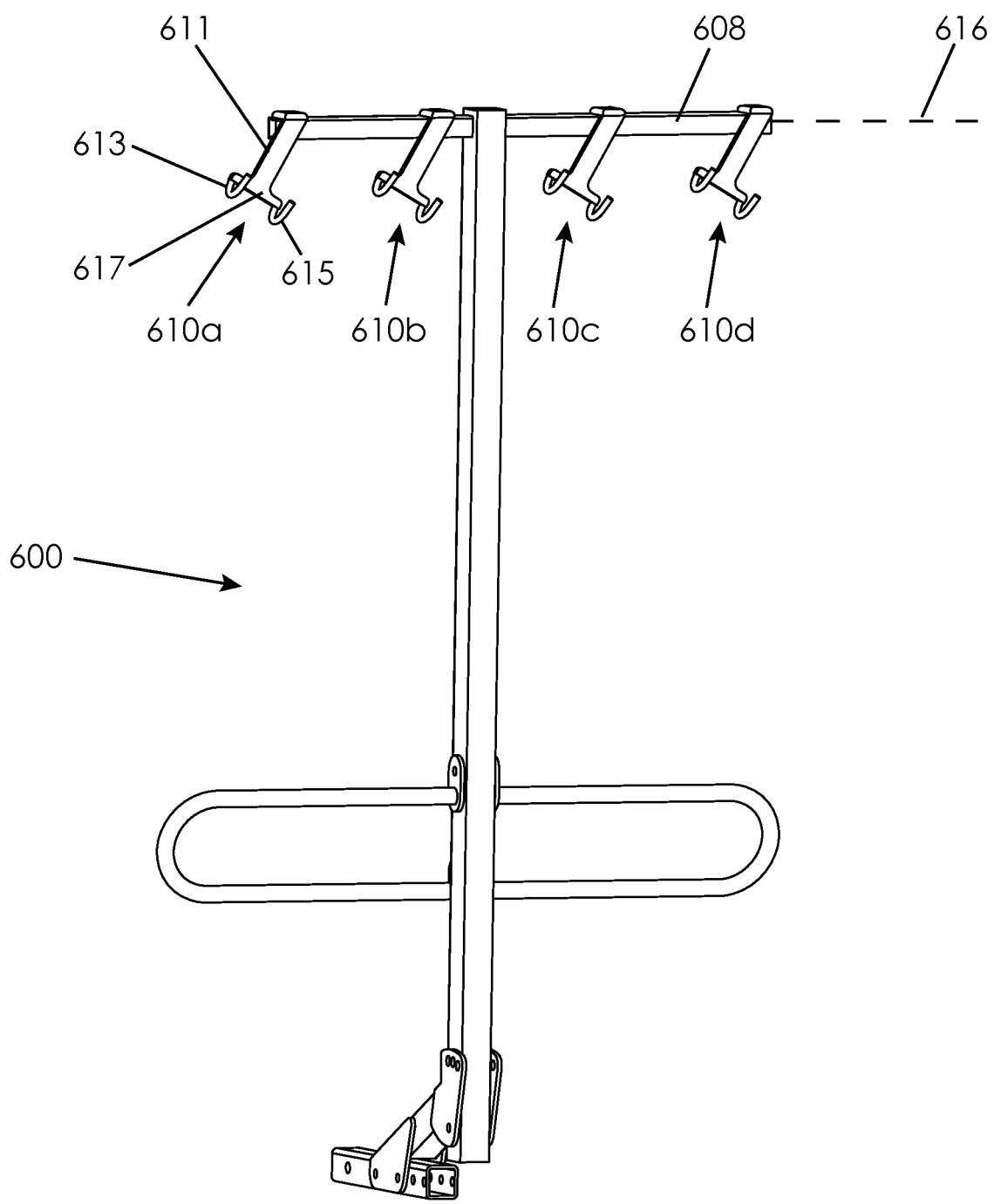
FIG. 29 is a perspective side view of a sixth embodiment of an improved bicycle carrier.
Figure 30:
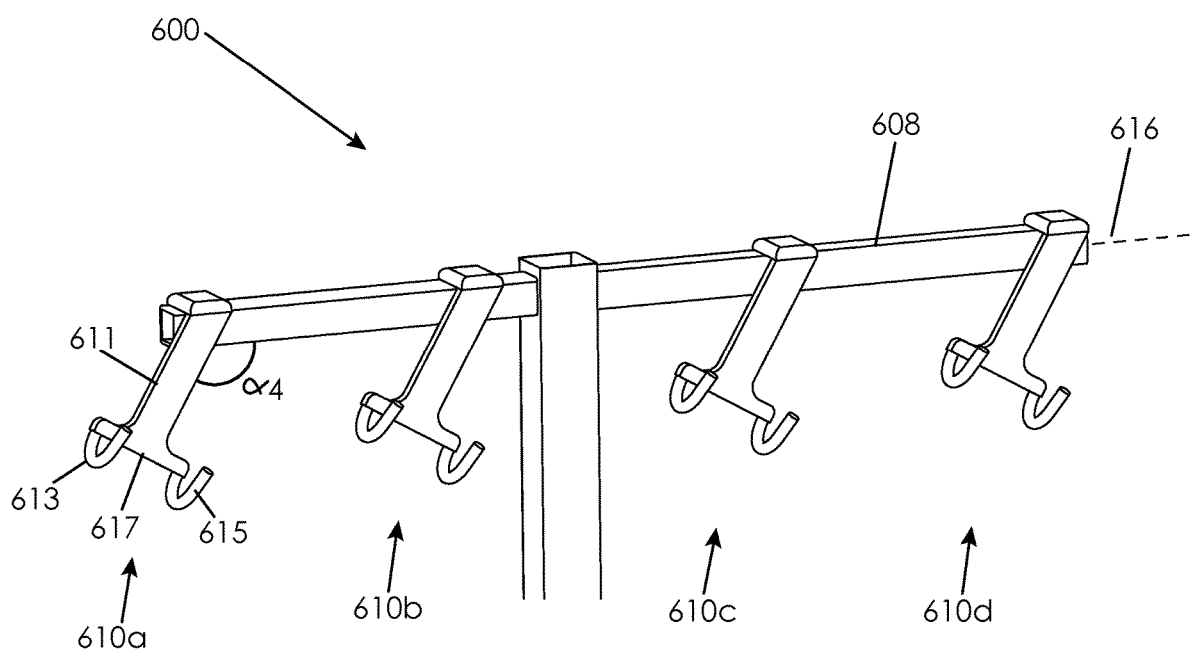
FIG. 30 is a side view of the upper bar and fork crown cradles of the bicycle carrier of FIG. 29.
Figure 31:
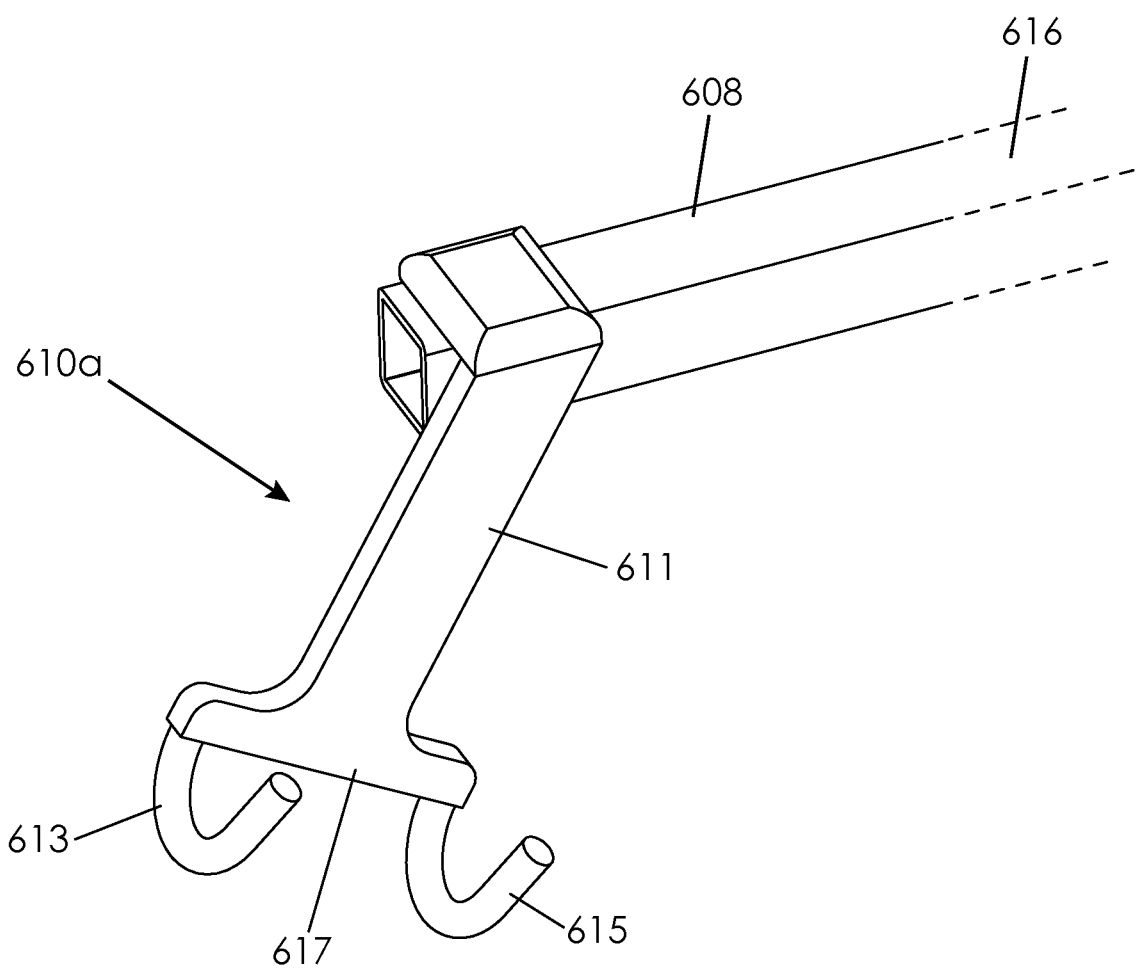
FIG. 31 is an enlarged perspective view of a fork crown cradles of the bicycle carrier of FIG. 29.

A sixth embodiment of an improved bicycle carrier 600 is shown in FIGS. 29 to 31. The sixth embodiment of the bicycle carrier 600 is identical in structure and function to the fifth embodiment of the bicycle carrier 500 with the exception that in the sixth embodiment of the bicycle carrier 600 the fork crown cradles 610a, 610b, 610c and 610d have a different structure. The fork crown cradles of the sixth embodiment of the bicycle carrier are substantially similar in structure and function. Accordingly, only one of the fork crown cradle 610a is described in detail herein with understanding that the other fork crown cradles 610b, 610c and 610d have a similar structure and function in a similar manner. The fork crown cradle 610a includes a T-shaped member 611 which extends angularly from the upper horizontal bar member 608 and is oblique relative to a longitudinal axis 616 of the upper horizontal bar member. In this example, T-shaped member 611 extends at an angle of approximately forty-five degrees relative the longitudinal axis 616 of the upper horizontal bar member 608 as shown in FIG. 30 by angle $\alpha_4$ for T-shaped member 611 of the fork crown cradle 610a. In other examples angle $\alpha_4$ may be any suitable or desired angle.

The fork crown cradle 610a further includes hooks 613 and 615 which are disposed at opposite ends of a cross-bar 617 of the T-shaped member 611. The fork crown cradle 610a receives a fork crown of a mounted bicycle such that a head tube extends outwardly from the fork crown cradle 610a between the hooks 613 and 615 while the hooks are disposed between the fork tubes. This is similar as described and shown above for the fifth embodiment of the bicycle carrier 500.

It will be understood by a person skilled in the art that the terms "upper", "lower", "horizontal" and "vertical" as used herein are used in relation to the orientation of the bicycle carrier as shown in the drawings.

It will be further understood by a person skilled in the art that many of the details provided above are by way of example only, and are not intended to limit the scope of the invention which is to be determined with reference to following claims.

What is claimed is:

1. In combination, a bicycle and a bicycle carrier, the bicycle including a fork crown, and the bicycle carrier comprising:
   a support mast;
   an elongate support member extending from the support mast and having a longitudinal axis; and
   a fork crown cradle disposed along the elongate support member, the fork crown cradle including at least one member protruding angularly relative to the longitudinal axis of the elongate support member, and the fork crown cradle including one or more rods protruding angularly relative to the longitudinal axis of the elongate support member, the at least one member and the one or more rods being spaced-apart so as to allow the fork crown of the bicycle to be received by the fork crown cradle.

2. In combination, a bicycle and a bicycle carrier, the bicycle including a fork crown, and the bicycle carrier comprising:
   a support mast;
   an elongate support member extending from the support mast and having a longitudinal axis; and
   a fork crown cradle disposed along the elongate support member, the fork crown cradle including at least one member extending angularly relative to the longitudinal axis of the elongate support member, and the fork crown cradle engaging or receiving the fork crown of the bicycle.

3. The combination as claimed in claim 2 wherein the fork crown cradle includes at least one tine extending angularly at a non-perpendicular angle relative to the longitudinal axis of the elongate support member.

4. The combination as claimed in claim 3 wherein the at least one tine of the fork crown cradle is spaced-apart from the at least one member of the fork crown cradle.

5. The combination as claimed in claim 3 wherein the at least one member of the fork crown cradle comprises a first rod portion and a second rod portion.

6. The combination as claimed in claim 5 wherein the rod portions are coupled together.

7. The combination as claimed in claim 5 wherein the rod portions of the fork crown cradle align within a plane and wherein the at least one tine of the fork crown cradle is spaced-apart from said plane.

8. The combination as claimed in claim 3, wherein the bicycle includes fork tubes and a head tube, wherein the at least one member of the fork crown cradle and the at least one tine of the fork crown cradle are spaced-apart so as to allow the fork crown of the bicycle to be received by the fork crown cradle, wherein the at least one member of the fork crown cradle is disposed between the fork tubes of the bicycle and wherein the at least one tine of the fork crown cradle is disposed adjacent to the head tube of the bicycle.

9. The combination as claimed in claim 2 wherein the at least one member of the fork crown cradle comprises one or more rods.

10. The combination as claimed in claim 2, wherein the bicycle includes a head tube, and wherein the fork crown cradle engages or receives the head tube of the bicycle.

11. The combination as claimed in claim 2 wherein the fork crown cradle includes at least one rod extending angularly at a non-perpendicular angle relative to the longitudinal axis of the elongate support member, wherein the at least one rod of the fork crown cradle and the at least one member of the fork crown cradle protrude past the fork crown of the bicycle, and wherein the fork crown of the bicycle extends between the at least one rod of the fork crown cradle and the at least one member of the fork crown cradle.

12. The combination of claim 2, wherein the fork crown cradle includes a first rod portion extending angularly at a non-perpendicular angle relative to the longitudinal axis of the elongate support member, a second rod portion extending angularly at a non-perpendicular angle relative to the longitudinal axis of the elongate support member, and at least one tine extending angularly at a non-perpendicular angle relative to the longitudinal axis of the elongate support member.

13. The combination as claimed in claim 12, wherein the first rod portion of the fork crown cradle is set at a first angle between zero and ninety degrees with respect to the longitudinal axis of the elongate support member, wherein the second rod portion of the fork crown cradle is set at a second angle between zero and ninety degrees with respect to the longitudinal axis of the elongate support member, and wherein the at least one tine of the fork crown cradle is set at a third angle between zero and ninety degrees with respect to the longitudinal axis of the elongate support member.

14. The combination as claimed in claim 12 wherein the rod portions of the fork crown cradle align within a plane and wherein the at least one tine of the fork crown cradle is spaced-apart from said plane.

15. The combination as claimed in claim 12 wherein the rod portions of the fork crown cradle are coupled together and form a V-shaped structure.

16. The combination as claimed in claim 12 wherein the bicycle includes fork tubes and a head tube, wherein the rod portions of the fork crown cradle are disposable between the fork tubes of the bicycle and wherein the at least one tine of the fork crown cradle is adjacent to the head tube of the bicycle.

17. The combination as claimed in claim 2, wherein the at least one member of the fork crown cradle extends angularly at a non-perpendicular angle relative to the longitudinal axis of the elongate support member.

18. In combination, a bicycle and a bicycle carrier, the bicycle including fork tubes, and the bicycle carrier comprising:
   a support mast;
   an elongate support member extending from the support mast and having a longitudinal axis; and
   a fork crown cradle disposed along the elongate support member, the fork crown cradle including at least one member extending angularly relative to the longitudinal axis of the elongate support member, with the fork tubes of the bicycle being disposed on opposite sides of said at least one member of the fork crown cradle.

19. The combination as claimed in claim 18, wherein the bicycle includes a head tube, and wherein the fork crown cradle includes at least one tine extending angularly at a non-perpendicular angle relative to the longitudinal axis of the elongate support member, the head tube of the bicycle extending outwardly from the at least one tine of the fork crown cradle.

20. The combination as claimed in claim 18, wherein the bicycle includes a head tube and wherein the fork crown cradle includes at least one tine extending angularly at a non-perpendicular angle relative to the longitudinal axis of the elongate support member, the at least one tine of the fork crown cradle being disposable adjacent to the head tube of the bicycle.

* * * * *